United States Patent Office 3,097,910
Patented July 16, 1963

3,097,910
PROCESS FOR DYEING TEXTILES WITH DYE-STUFFS CONTAINING PYRIMIDINE RING
Herbert Francis Andrew and Victor David Poole, Manchester, England, assignors to Imperial Chemical Industries Limited, London, England, a corporation of Great Britain
No Drawing. Original application June 29, 1960, Ser. No. 39,723. Divided and this application Mar. 16, 1961, Ser. No. 96,099
Claims priority, application Great Britain Oct. 23, 1959
9 Claims. (Cl. 8—54.2)

This invention relates to new dyestuffs and more particularly it relates to new dyestuffs which are valuable for colouring natural and artificial textile materials.

According to the invention there are provided the new dyestuffs which contain at least one group of the formula:

$$-A-X \qquad \text{Formula I}$$

wherein A represents —O—, —S— or

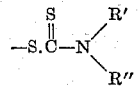

R represents a hydrogen atom or a substituted or unsubstituted alkyl radical and X represents a pyrimidine ring which is attached to A through the carbon atom in the 2- or 4-position of the pyrimidine ring, and which carries a cyano, carboxy or carboalkoxy group attached to the 5-position of the pyrimidine ring and which also carries one or two chlorine or bromine atoms attached to the remaining carbon atoms of the pyrimidine ring.

Each of the groups of Formula I, as hereinbefore defined, is attached to a carbon atom present in the dyestuff. The said carbon atom may form part of an aryl residue present in the dyestuff or may form part of an alkyl chain which is directly attached to an aryl residue present in the dyestuff or is attached to an aryl residue through a bridging atom or group. As examples of such bridging atoms or groups there may be mentioned —O—, —S—, —CO—, —SO$_2$—, —NH—, —Nalkyl, —CONH—, —SO$_2$NH— and —SO$_2$Nalkyl The dyestuff may be a member of any known dyestuff series and preferably it is a dyestuff of the azo, which may be monoazo or polyazo, nitro, anthraquinone or phthalocyanine series, and which may or may not contain a water-solubilising group such as a sulphonic, carboxylic or a sulphamyl group. If desired the dyestuff may also contain coordinately bound metal such as coordinately bound copper, chromium or cobalt.

As examples of the carboalkoxy groups which are attached to the 5-position of the pyrimidine ring there may be mentioned carbo lower alkoxy groups such as carbomethoxy, carboethoxy and carbopropoxy groups.

As examples of the substituted or unsubstituted alkyl radicals represented by R there may be mentioned lower alkyl radicals such as methyl, ethyl, propyl and butyl, which may contain substituents such as methoxy, ethoxy and hydroxy groups.

When the pyrimidine ring represented by X contains only one chlorine or bromine atom attached to one of the two remaining carbon atoms of the said ring then the remaining carbon atom of the said ring may be optionally substituted by an alkyl radical which is preferably a lower alkyl radical such as ethyl and propyl and preferably a methyl radical, or by a thiocyano group or by a group of the formula:

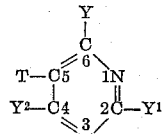

Formula II wherein R' and R" each represent substituted or unsubstituted hydrocarbon or heterocyclic radicals, or R' and R" may be joined together to form with the nitrogen atom N a 5- or 6-membered heterocyclic ring. R' and R" preferably represent alkyl radicals, in particular lower alkyl radicals such as methyl, ethyl, propyl and butyl radicals, or a cycloalkyl radical, in particular the cyclohexyl radical, or a monocyclic aryl radical such as the phenyl radical.

According to a further feature of the invention there is provided a process for the manufacture of the new dyestuffs, as hereinbefore defined, which comprises treating a dyestuff compound containing at least one group of the formula: —AH, wherein A has the meaning above, with a pyrimidine which contains a cyano, carboxy or carboalkoxy group attached to the 5-position of the pyrimidine ring and which also carries two or three chlorine or bromine atoms attached to the remaining carbon atoms of the pyrimidine ring.

This process of the invention may be conveniently brought about by adding a solution of the pyrimidine in a water-miscible organic liquid such as acetone or dioxan to a solution or suspension of the dyestuff compound in water, or in a water-miscible organic liquid such as acetone or dioxan, or in a mixture of water and/or a water-miscible organic liquid, stirring the mixture at a suitable temperature, for example at a temperature between 10° C. and 90° C., whilst maintaining the pH of the mixture between 6 and 7 by the addition of an acid-binding agent such as sodium carbonate or sodium hydroxide, and filtering off the dyestuff which is precipitated. If necessary water and/or sodium chloride can be added to ensure complete precipitation of all the dyestuff.

When the pyrimidine used in this process of the invention contains only two chlorine or bromine atoms attached to two of the remaining 3 carbon atoms of the pyrimidine ring then the third carbon atom may optionally be substituted by an alkyl radical or by a thiocyano group or by a group of Formula II, as hereinbefore defined. The pyrimidines used in the process of the invention can therefore be represented by the formula:

$$\begin{array}{c} Y \\ | \\ C \\ \diagup \diagdown 6 \diagdown \\ T-C5 \quad 1N \\ | \quad \| \\ Y^2-C4 \quad 2C-Y^1 \\ \diagdown 3 \diagup \\ N \end{array}$$

Formula III wherein T represents a cyano, carboxy or carboalkoxy group, Y represents a chlorine or a bromine atom, one of $Y^1$ and $Y^2$ represents a chlorine or a bromine atom, and the other $Y^1$ or $Y^2$ represents a hydrogen, chlorine or bromine atom, or an alkyl radical or a thiocyano group or a group of Formula II, as hereinbefore defined.

The pyrimidines of Formula III wherein one of $Y^1$ and $Y^2$ represents a chlorine or a bromine atom and the other $Y^1$ or $Y^2$ represents a hydrogen, chlorine or bromine atom or an alkyl radical may themselves be obtained by treating the corresponding di- or trihydroxypyrimidines with the appropriate phosphorous oxyhalide, preferably in the presence of a tertiary amine such as dimethylaniline or diethylaniline, for example as described in volume 20 of The Journal of Organic Chemistry at page 837. Alternatively the pyrimidines of Formula III wherein one of $Y^1$ and $Y^2$ represents a chlorine or a bromine atom and the other $Y^1$ or $Y^2$ represents a hydrogen, chlorine or bromine atom or an alkyl radical and T represents a cyano group may be obtained by treating the corresponding 5-carbonamido-(di- or tri-)hydroxypyrimidine with the appropriate phosphorous oxyhalide in the presence of a tertiary amine.

The pyrimidines of Formula III wherein one of $Y^1$ and $Y^2$ represents a thiocyano group or a group of Formula II and the other $Y^1$ or $Y^2$ represents a chlorine or a bromine atom may themselves be obtained by reacting a pyrimidine of Formula III wherein both of $Y^1$ or $Y^2$ represent chlorine or bromine atoms with potassium thiocyanate or with a compound of the formula:

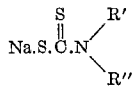

wherein R' and R" have the meanings stated above.

As specific examples of the pyrimidines of Formula III which can be used in this process of the invention there may be mentioned 5-cyano-2:4:6-trichloropyrimidine, 5-cyano-2:4:6-tribromopyrimidine, 5-cyano-2:4-dichloropyrimidine, 5 - cyano-2:4-dibromopyrimidine, 5-cyano-2-methyl-4:6-dichloropyrimidine, 5-carbomethoxy-2:4-dichloropyrimidine, 5-carbethoxy-2:4-dichloropyrimidine and 5-carboxy-2:4-dichloropyrimidine.

Each of the —AH groups present in the dyestuff compounds used in the process of the invention is directly attached to a carbon atom of an aryl residue present in the dyestuff compound, or each of the —AH groups is attached to a carbon atom which forms part of an alkyl radical which is directly attached to an aryl residue present in the dyestuff compound or is attached through a linking atom or group. As examples of such linking atoms or groups there may be mentioned —O—, —S—, —NH—,

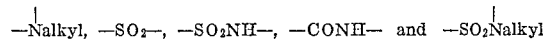

It is however preferred that each of the —AH groups present in the dyestuff compound is the group —NHR wherein R has the meaning stated above.

Dyestuff compounds of the azo series containing at least one —NHR group, as hereinbefore defined, which may be used in the process of the invention may be obtained by a variety of methods. One method is to diazotise an aromatic primary amine and couple the diazonium compound so obtained with a coupling component containing an —NHR group. As examples of aromatic primary amines which may be used in this manner to obtain the aminoazo compounds there may be mentioned aniline, o-, m- and p-toluidines, o-, m- and p-anisidines, o-, m- and p-chloroanilines, 2:5-dichloroaniline, α- and β-naphthylamine, 2:5-dimethylaniline, 5-nitro-2-aminoanisole, 4-aminodiphenyl, aniline-2-, 3- and 4-carboxylic acids, 2-aminodiphenylether, 2-, 3- or 4-aminobenzene sulphonamide or sulphonmonomethyl- or ethylamides or sulphondimethyl- or sulphondiethylamides, dehydrothio-p-toluidine monosulphonic acid or dehydrothio-p-toluidine disulphonic acid, aniline-2-, -3- and -4-sulphonic acids, aniline-2:5-disulphonic acid, 2:4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3:4-dichloroaniline-6-sulphonic acid, 4-methylaniline-2-sulphonic acid, 3-methylaniline-6-sulphonic acid, 2:4-dimethoxyaniline-6-sulphonic acid, 4-methoxyaniline-2-sulphonic acid and 5-methoxyaniline-2-sulphonic acid, 2:5-dichloroaniline-4-sulphonic acid, 2-naphthylamine-4:8 and 6:8-disulphonic acids, 1-naphthylamine-2-, 4-, 5-, 6- or 7-monosulphonic acid, 1-naphthylamine-3:6-disulphonic acid, 2-naphthylamine-3:6- and 5:7-disulphonic acids, 2-naphthylamine-3:6:8-trisulphonic acid, m- and p-nitroaniline, 4-nitroaniline-2-sulphonic acid, 3-nitroaniline-6-sulphonic acid, m- or p-aminoacetanilide and 4-amino-2-acetylaminotoluene-5-sulphonic acid.

As examples of coupling components which can be used there may be mentioned 2-amino- and 2-methylamino-5-naphthol-7-sulphonic acids, 2-amino and 2-methylamino-8-naphthol-6-sulphonic acids, 1-amino and 1-ethylamino-8-naphthol-6-sulphonic acids and corresponding 3:6- and 4:6-disulphonic acids, 1-(3'- or -4'-aminobenzoylamino)-8-naphthol-3:6- and 4:6-disulphonic acids, aniline, o- and m-anisidines, o-, and m-toluidines, 2:5-dimethylaniline, 3-amino-4-methoxytoluene, 2:5-dimethoxyaniline, N-methylaniline, N-ethyl-o-toluidine, N-methyl-m-anisidine, 3-methylamino-4-methoxytoluene, 1-(3'-aminophenyl)-3-methyl-, -carboxy-, and -carboethoxy-5-pyrazolone, 1-(4'-aminophenyl)-3-methyl-, -carboxy-, and -carboethoxy-5-pyrazolones and 1-(4'-amino-3'-carboxyphenyl)-3-methyl-5-pyrazolone.

The aminoazo compounds which are to be used in the process of the invention are not restricted to compounds containing only one azo group. Disazo compounds which may be used may be obtained for example by tetrazotisation of an aromatic diamine containing two primary amino groups and coupling the tetrazo compound so obtained with 2 molecular proportions of one of the above-defined coupling components, or with 1 molecular proportion of each of two of the above-defined coupling components, or with 1 molecular proportion of one of the above defined coupling components and with 1 molecular proportion of a coupling component not containing an amino group. As examples of such aromatic diamines there may be mentioned benzidine, 3:3'-dimethoxybenzidine, benzidine-2:2'-disulphonic acid, benzidine-3:3'-dicarboxylic acid, benzidine-3:3'-diglycollic acid and 4:4'-diaminostilbene-2:2'-disulphonic acid. Alternatively disazo or polyazo compounds may be obtained by the use of primary aromatic amines or diamines containing azo groups. As examples of such primary aromatic amines or diamines containing azo groups which may be used there may be mentioned 4-aminoazobenzene-4'-sulphonic acid, 4'-amino-2'-methylphenylazo-2-naphthalene-4:8-disulphonic acid and 4-amino-5-methoxy-2-methyl-4'-nitro - 2' - sulphoazobenzene.

A similar method of obtaining the dyestuff compounds of the azo series which may be used in the process of the invention comprises coupling a coupling component which optionally contains an —NHR group with a diazonium compound which contains an —NHR group. Such diazonium compounds may be obtained by methods known from the art, by the diazotisation of aromatic primary amines containing a second amine group or containing a mono-substituted amino group. As examples of such aromatic primary amines there may be mentioned p-phenylene-diamine, 1:4-phenylenediamine-2-sulphonic acid, 1:4-phenylenediamine-2-carboxylic acid and 1:4-diamino-naphthalene-2-sulphonic acid. As examples of coupling components which may be used in this manner there may be mentioned the coupling components listed above and also β-naphthol, 2-naphthol-6- or -7-sulphonic acid, 2-naphthol-3:6- or 6:8-disulphonic acid, 1 naphthol-4-sulphonic acid, 1-phenyl-3-methyl-5-pyrazolone, 1-(4'-sulphophenyl)-3-methyl-5-pyrazolone, 1-(2':5'-dichloro-4'-sulphophenyl)-3-methyl-5-pyrazolone, 2-benzoylamine-5-naphthol-7-sulphonic acid, 1-benzoylamino-8-naphthol-3:6- or 4:6-disulphonic acid, phenol, p-cresol, acetoacetanilide and acetoacet-2-methoxyanilide-5-sulphonic acid.

A further method of obtaining the dyestuff compounds of the azo series which may be used in the process of the invention is to treat an azo or polyazo compound containing at least one acylamino group with aqueous acid or aqueous alkali in order to cause hydrolysis of the acylamino group or groups. Such azo or polyazo compounds may be obtained from aromatic primary amines and/or coupling components containing acylamino groups. As examples of such aromatic primary amines there may be mentioned monoacetylbenzidine, 4-amino-1-acetylaminonaphthalene-5-sulphonic acid, 4-amino-4'-acetylaminodiphenyl-3-sulphonic acid, 4-amino-3-sulphoacetanilide, 3-amino-4-sulphoacetanilide and 4-amino-4'-acetylaminostilbene-2:2'-disulphonic acid, and as examples of such coupling components there may be mentioned 2-acetylamino-5-naphthol-7-sulphonic acid, 2-N-acetyl-N-methylamino-5-naphthol-7-sulphonic acid, 2-acetylamino- and 2-N-acetyl-N-methylamino-8-naphthol-6-sulphonic acids and 1-acetylamino-8-naphthol-3:6- and 4:6-disulphonic acids.

As examples of dyestuff compounds of the anthraquinone series which may be used in the process of the invention there may be mentioned anthraquinone compounds containing a group of the formula —NHR as hereinbefore defined, attached to an alkylamino or an arylamino group which is itself attached to an alpha-position of the anthraquinone nucleus. As examples of such anthraquinone compounds there may be mentioned 1-amino - 4 - (4' - aminoanilino-)anthraquinone-2:3'-disulphonic acid and the corresponding 2:3':5- and 2:3':6-trisulphonic acids, 1-amino-4-(4"-amino-4'-benzoylaminoanilino)-anthraquinone-2:3-disulphonic acid and the corresponding -2:3':5-trisulphonic acid, 1-amino-4-[4'-(4"-aminophenylazo-)anilino-]anthraquinone - 2:2''' - 5-trisulphonic acid, 1-amino-4-(4'-amino-3'-carboxyanilino-)anthraquinone-2:5-disulphonic acid, 1-amino-4-(3'-aminoanilino)anthraquinone-2:4':5-trisulphonic acid and the corresponding 2:4'-disulphonic acid, 1-amino-4-[4'-(4"-aminophenyl-)anilino-] - anthraquinone - 2:3'':5 - trisulphonic acid, 1-amino-4-(4'-methylamino)anilinoanthraquinone-2:3'-disulphonic acid and the corresponding 2:3':5-trisulphonic acid, 1-amino-4-(4'-n-butylamino-)anilinoanthraquinone-2:3'-disulphonic acid, 1-amino-4-(4'-methylamino-3'-carboxyanilino-)anthraquinone-2-sulphonic acid, 1-amino-4-(3'-beta-hydroxyethylamino-)anilinoanthraquinone - 2:5 - disulphonic acid, 1 - (4'-aminoanilino) - anthraquinone - 2:3'-disulphonic acid and 1-amino - 4 - (4' - amino-2'-methoxyanilino)anthraquinone-2:3'-disulphonic acid.

Such dyestuff compounds of the anthraquinone series may themselves be obtained from anthraquinone compounds, containing a halogen atom or a nitro group attached to the appropriate alpha-position of the anthraqinone nucleus, or from the leuco derivative of a 1:4-dihydroxy, -diamino- or -amino-hydroxy-anthraquinone, by interacting the appropriate anthraquinone compound with at least one molecular proportion of an aliphatic or an aromatic diamine.

Dyestuff compounds of the phthalocyanine series which may be used in the process of the invention are preferably metal-containing phthalocyanines, such as copper phthalocyanines, containing at least one water-solubilising group such as a sulphonic acid group, and at least one group of the formula —NHR as hereinbefore defined. The —NHR group or groups may be attached directly to the benz-rings of the phthalocyanine nucleus or they may be attached thereto through a divalent bridging radical for example -phenylene-, —CO-phenylene-, —SO₂-phenylene-, —NH-phenylene, —S-phenylene-, —O-phenylene, —CH₂S-phenylene-, —CH₂O-phenylene-, —CH₂-phenylene-, —SCH₂-phenylene, —SO₂CH₂-phenylene-, —SO₂NR₁-phenylene-CH₂—

—SO₂NR₁-arylene-, —NR₁CO₁-phenylene, —NR₁SO₂-phenylene, —SO₂O-phenylene-, —CH₂—, —CH₂NR₁-phenylene, —CH₂NH.CO-phenylene-, —SO₂NR₁-alkylene-, —CH₂NR₁-alkylene-, —CONR₁-phenylene-CH₂—, —CONR₁-arylene-, —SO₂— and —CO—. In the above divalent bridging radicals, R₁ stands for hydrogen, alkyl or cycloalkyl, arylene stands for an aromatic divalent bridging radical wherein the terminal valence bonds may be attached to the same or different nuclei, and alkylene stands for an aliphatic divalent radical which may include hetero-atoms such as nitrogen as well as carbon in the chain of atoms, for example it may stand for the radical —CH₂CH₂—NH—CH₂CH₂—, and the phenylene groups may be substituted for example by halogen, alkyl and alkoxy.

As examples of aromatic divalent bridging radicals denoted by arylene there may be mentioned aromatic nuclei, for example a benzene nucleus, a napthalene nucleus, an acridine nucleus and a carbazole nucleus, which nuclei may bear further substituents, and radicals of the formula:

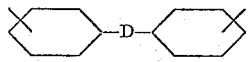

wherein the benzene rings may bear further substituents and wherein —D— stands for a bridging group, for example —CH=CH—, —NH—, —S—, —O—, —SO₂—, —NO=N—, —N=N—, —NH.CO.NH—, —CO.NH—, —O.CH₂CH₂O— and

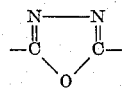

As specific examples of dyestuff compounds of the phthalocyanine series which may be used in the process of the invention there may be mentioned copper phthalocyanine - 4 - N-(4-amino-3-sulphophenyl-)-sulphonamide-4':4''':4'''-trisulphonic acid, cobalt, phthalocyanine-4:4'-di - N - (3'-amino-4'-sulphophenyl-)carbonamide-4''':4'''-dicarboxylic acid and copper -4-(4'-amino-3'-sulphobenzoyl-)phthalocyanine.

There may also be used mixtures of aminophthalocyanines, for example there may be used a mixture of approximately equal parts of copper phthalocyanine-N-(4-amino-3-sulphophenyl-)sulphonamide trisulphonic acid and copper phthalocyanine di - N - (4-amino-3-sulphophenyl-)sulphonamide disulphonic acid.

The aminophthalocyanines which contain a sulphonic acid can be obtained either by the sulphonation of known phthalocyanines containing primary or secondary amino groups or by synthesis from mixtures of phthalic acid derivatives and sulphonated phthalic acid derivatives. Thus treatment with a sulphonating agent for example oleum such as a 20% solution of sulphur trioxide in sulphuric acid of the amines described in United Kingdom specifications Nos. 569,200 and 589,118 gives suitable amino-phthalocyanines. The aminophthalocyanine compounds so obtained are those containing the divalent bridging radical -phenylene-, —CO-phenylene-, —SO₂-phenylene-, —NH-phenylene-, —S-phenylene, —O-phenylene, —CH₂S-phenylene- —CH₂O-phenylene-, —CH₂-phenylene-, —SCH₂-phenylene- and —SO₂CH₂-phenylene.

Those aminophthalocyanine compounds which contain the divalent bridging radicals mentioned in the last paragraph and also those containing —NR₁CO-phenylene, —SO₂-NR₁-phenylene-, –NR₁SO₂-phenylene-, and SO₂O-phenylene linkages as bridging radicals may be obtained by heating together suitable derivatives of sulphonated phthalic acid and the substituted phthalic acids mentioned in the aforesaid United Kingdom specifications Nos. 569,200 and 589,118 by the general methods known to be used for the manufacture of phthalocyanines from suitable phthalic acid derivatives, for example, by heating together a mixture of 4-sulphophthalic anhydride and 4-p-nitrobenzoylphthalic anhydride, urea, cupric chloride and ammonium molybdate in o-dichlorobenzene at about 150° C.; those which contain the —CH₂-linkage may be obtained by sulphonation of the primary and secondary amines of United Kingdom specifications Nos. 717,137 and 724,212; those which contain the —CH₂NR₁-phenylene-linkage way be obtained by reacting a primary (or secondary N-alkyl or cycloalkyl)nitroaniline with a phthalocyanine containing chloromethyl and sulphonic or carboxylic acid groups obtained by chloromethylation of a phthalocyanine sulphonic or carboxylic acid, and reducing the product so obtained, for example with sodium sulphide, or by reacting a chloro-methyl phthalocyanine with for example a diaminobenzenesulphonic acid or -carboxylic acid; those which contain the SO₂NR₁-alkylene-linkage may be obtained by reacting a phthalocyanine containing chlorosulphonyl groups with a monoacetyl alkylene diamine in the presence of water, and treating the product so obtained (which contains both sulphonamide and sulphonic acid groups) with aqueous alkali to hydrolyse the acetylamino group; those which contain the —SO₂NR₁-phenylene-CH₂-linkage may be obtained in a similar manner by using an amino-N-benzylacetamide in place of the monoacetylalkylene diamine; those which contain the —CH₂.NR₁-alkylene-linkage may be obtained by reacting a phtalocyanine containing chloromethyl and sulphonic or carboxylic acid groups with a monoacetyl alkylene diamine and treating the product so obtained with aqueous alkali to hydroylse the acetylamino groups; those containing a direct link, so that the amino group is attached directly to the phthalocyanine nucleus, may be obtained by sulphonating the amino-phthalocyanines described in United Kingdom specification No. 529,847 or where a starting material containing less than 4 amino groups attached to the phthalocyanine nucleus is desired, it may be obtained by heating together a mixture of suitable carboxy-or sulphophthalic acid derivatives with one of the substtiuted phthalic acid derivatives used as starting materials in United Kingdom specification No. 529,847 under conditions known to be used for the manufacture of phthalocyanines from phthalic acid derivatives, for example by heating the anhydrides with urea and a catalyst, for example ammonium molybdate, in an orgenic solvent, for example o-dichlorobenzene, and reducing the nitro-phthalocyanine sulphonic or carboxylic acid or hydrolysing the acylaminophthalocyanine sulphonic or carboxylic acid so obtained by known methods for the conversion or aromatic nitro or acylamino compounds to the corresponding amines; and those containing the —CO.NR₁-phenylene-linkage may be obtained by reacting a phthalocyanine compound containing carboxylic acid chloride groups with a diaminobenzene sulphonic acid or carboxylic acid or with an aminobenzene sulphonic acid or an aminobenzoic acid which also contains a nitro group and reducing the nitro-compound so obtained; and those containing the —CO—NR₁-phenylene-CH₂-linkage may be obtained by reacting a phthalocyanine compound containing carboxylic acid chloride groups with an N-aminobenzyl-)acetamide and subsequently hydrolysing the product so obtained with aqueous alkali.

Dyestuff compounds of the nitro series which may be used in the process of the invention are preferably those of the formula:

$$NO_2-D-N-Q$$
$$\quad\quad\quad |$$
$$\quad\quad\quad Z$$

wherein D stands for a naphthalene or benzene nucleus which may be further substituted, the nitrogen atom N is in the ortho position to the nitro group, Z stands for hydrogen or for a hydrocarbon radical which may be substituted, Q stands for hydrogen or for an organic radical attached to the nitrogen through a carbon atom, provided that Q and Z are not both hydrogen, and wherein Q may be connected to Z when Z is a hydrcarbon radical or to D, in the ortho position to the nitrogen atom N, to form a heterocyclic ring, and which contain at least one group of the formula —NHR, as hereinbefore defined.

As specific examples of dyestuff compounds containing at least one —NHR group, as hereinbefore defined, which may be used in the process of the invention, there may be mentioned the compounds of the following classes without, however, limiting the classes to those specifically described.

(1) Monoazo compounds of the formula:

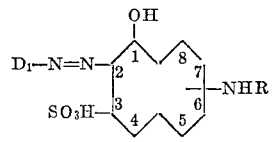

wherein $D_1$ represents an at most di-cyclic aryl radical which is free from azo groups and NHR groups, the —NHR group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenyl or diphenylamine radical. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —SO₃H group in ortho position to the azo link; the phenyl radical may be further substituted for example, by halogen atoms such as chlorine, alkyl radicals such as methyl, acylamino groups such as acetylamino and alkoxy radicals such as methoxy.

(2) Disazo compounds of Formula IV, wherein $D_1$ stands for a radical of the azobenzene, azonaphthalene or phenylazonaphthalene series and the naphthalene nucleus is substituted by the NHR group, and optionally by sulphonic acid as in class 1.

(3) Nonoazo compounds of the formula:

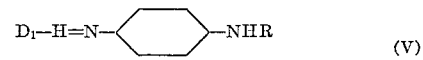

wherein $D_1$ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic acid and acylamino groups.

(4) Mono- or dis-azo compounds of the formula:

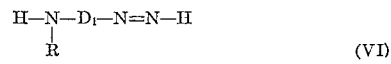

wherein $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable keto-methylene compound (such as an acetoacetarylide or a 5-pyrazolone) having the OH group o- to the azo group $D_1$ preferably represents a radical of the benzene series containing a sulphonic acid group.

(5) Mono or dis-azo compounds of the formula:

wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in α-position to the azo group.

(6) The metal complex, e.g. the copper, chromium and cobalt complex, compounds of those dyes of Formulae IV, VI and VII (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

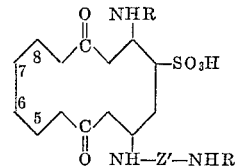

wherein the anthraquinone nucleus may contain an additional sulphonic acid group in the 5-, 6-, 7- or 8-position and Z' represents a bridging group which is preferably a divalent radical of the benzene series, for example phenylene, diphenylene, or 4,4'-divalent stilbene or azobenzene radicals. It is preferred that Z' should contain one sulphonic acid group for each benzene ring present.

(8) Phthalocyanine compounds of the formula:

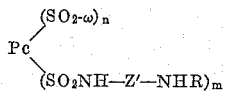

wherein Pc represents the phthalocyanine nucleus preferably of copper phthalocyanine, ω represents —OH and/or —NH$_2$, Z' represents a bridging group, preferably an aliphatic, cycloaliphatic or aromatic bridging group, $n$ and $m$ each represent 1, 2 or 3 and may be the same or different provided that $n+m$ is not greater than 4.

(9) Nitro dyestuffs of the formula:

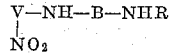

wherein V and B represent monocyclic aryl nuclei, the nitro group in V being ortho to the NH group.

In class 1:
- 6 - amino - 1 hydroxy - 2 (2' - sulphophenylazo)-naphthalene-3-sulphonic acid,
- 6 - methylamino - 1 - hydroxy - 2 - (4' - acetylamino-2' - sulphophenylazo)naphthalene - 3 - sulphonic acid,
- 8 - amino - 1 - hydroxy - 2 - (2' - sulphophenylazo)-naphthalene-3:6-disulphonic acid,
- 8 - amino - 1 - hydroxy - 2 - (4' - chloro - 2' - sulphophenylazo)-naphthalene-3:5-disulphonic acid,
- 7 - amino - 2 - (2':5' - disulphophenylazo) - 1 - hydroxynaphthalene-3-sulphonic acid,
- 7 - methylamino - 2 - (2' - sulphophenylazo) - 1 - hydroxynaphthalene-3-sulphonic acid,
- 7 - methylamino - 2 - (4' - methoxy - 2' - sulphophenylazo)-1-hydroxynaphthalene-3-sulphonic acid,
- 8 - (3' - aminobenzoylamino)1 - hydroxy - 2 - (2'-sulphophenylazo)naphthalene - 3:6 - disulphonic acid,
- 8 - amino - 1 - hydroxy - 2:2' - azonaphthalene-1':3:5':6-tetrasulphonic acid,
- 8 - amino - 1 - hydroxy - 2:2' - azonaphthalene-1':3:5'-trisulphonic acid,
- 6 - amino - 1 - hydroxy - 2:2' - azonaphthalene-1',3,5'-trisulphoric acid,
- 6 - methylamino - 1 - hydroxy - 2:2' - azonaphthalene-1',3,5'-trisulphonic acid,
- 7 - amino - 1 - hydroxy - 2,2' - azonaphthalene - 1',3-disulphonic acid,
- 8 - amino - 1 - hydroxy - 2 - (4' - hydroxy - 3' - carboxyphenylazo)-naphthalene-3,6-disulphonic acid,
- 6 - amino - hydroxy - 2 - (4' - hydroxy - 3' - carboxyphenylazo)-naphthalene-3,5-disulphonic acid.

In class 2:
- 8 - amino - 1 - hydroxy - 2 - [4' - (2'' - sulphophenylazo) - 2' - methoxy - 5' - methylphenylazo]naphthalene-3,6-disulphonic acid,
- 8 - amino - 1 - hydroxy - 2 - [4' - (4'' - methoxyphenylazo) - 2' - carboxyphenylazo]naphthalene - 3,6 - disulphonic acid,
- 8 - amino - 1 - hydroxy - 2 - [4' - (2'' - hydroxy - 3'',6'' - disulpho - 1'' - naphthylazo) - 2'' - carboxyphenylazo]naphthalene-3,6-disulphonic acid,
- 4,4' - bis(8'' - amino - 1'' - hydroxy - 3'',6'' - disulpho-2''-naphthylazo)-3,3'-dimethoxydiphenyl,
- 6 - amino - 1 - hydroxy - 2 - [4' - (2'' - sulphophenylazo) - 2' - methoxy - 5' - methylphenylazo]naphthalene-3,5-disulphonic acid.

In class 3:
- 2 - (4' - amino - 2' - methylphenylazo)naphthalene-4:8-disulphonic acid,
- 2 - (4' - amino - 2' - acetylaminophenylazo)naphthalene-5:7-disulphonic acid,
- 4 - nitro - 4' - (4'' - methylaminophenylazo)stilbene-2,2'-disulphonic acid,
- 4 - nitro - 4' - (4'' - amino - 2'' - methyl 5'' - methoxyphenylazo) - stilbene - 2,2' - disulphonic acid,
- 4 - amino - 4' - (4'' - methoxyphenylazo)stilbene-2,2'-disulphonic acid,
- 4 - amino - 2 - methylazobenzene - 2':5' - disulphonic acid.

In class 4:
- 1 - (2',5' - dichloro-4' - sulphophenyl) - 3 - methyl-4 - (3'' - amino - 4'' - sulphophenylazo) - 5 - pyrazolone,
- 1 - (4' - sulphophenyl) - 3 - carboxy - 4 - (4''-amino-3''-sulphophenylazo)-5-pyrazolone,
- 1 - (2' - methyl - 5' - sulphophenyl) - 3 - methyl - 4 - (4''-amino-3''-sulphophenylazo)-5-pyrazolone,
- 1 - (2' - sulphophenyl) - 3- methyl - 4 -(3'' - amino-4''-sulphophenylazo)-5-pyrazolone,
- 4 - amino - 4' - (3'' - methyl - 1'' - phenyl - 4'' - pyrazol-5''-onylazo)-stilbene-2,2'-disulphonic acid,
- 4 - amino - 4' - (2'' - hydroxy - 3'',6'' - disulpho - 1''-naphthylazo)-stilbene-2,2'-disulphonic acid,
- 8 - acetylamino - 1 - hydroxy - 2 - (3' - amino - 4'-sulphophenylazo)naphthalene - 3,6 - disulphonic acid,
- 7 - (3' - sulphophenylamino) - 1 - hydroxy - 2 - (4'-amino - 2' - carboxyphenylazo)naphthalene - 3-sulphonic acid,
- 8 - phenylamino - 1 -hydroxy - 2 - (4' - amino - 2'-sulphophenylazo)naphthalene - 3,6 - disulphonic acid,
- 6 - acetylamino - 1 - hydroxy - 2 - (5' - amino - 2'-sulphophenylazo)naphthalene-3-sulphonic acid In class 5:
- 1 - (3' - aminophenyl) - 3 - methyl - 4 -(2':5' - disulphophenylazo) - 5 - pyrazolone,
- 1 - (3' - aminophenyl) - 3 - carboxy - 4 - (2' - carboxy-4'-sulphophenylazo)-5-pyrazolone,
- 4 - amino - 4' - [3'' - methyl - 4'' - (2''',5''' - disulphophenylazo) - 1'' - pyrazol - 5'' - onyl]stilbene-2,2'-disulphonic acid,
- 1 - (3' - aminophenyl) - 3 - carboxy - 4 - [4'' - (2''',5''' - disulphophenylazo) - 2'' - methoxy - 5''-methylphenyl azo]-5-pyrazolone.

In class 6:
- The copper complex of 8-amino-1-hydroxy-2-(2'-hydroxy - 5'' - sulphophenylazo)naphthalene - 3:6-disulphonic acid,
- The copper complex of 6-amino-1-hydroxy-2-(2'-hydroxy - 5' - sulphophenylazo)naphthalene - 3 - sulphonic acid,
- The copper complex of 6-amino-1-hydroxy-2-(2'-hydroxy - 5' - sulphophenylazo)naphthalene - 3,5-disulphonic acid,
- The copper complex of 8-amino-1-hydroxy-2-(2'-hydroxy - 3' - chloro - 5' - sulphophenylazo)naphthalene-3,6-disulphonic acid,
- The copper complex of 6-methylamino-1-hydroxy-2-(2' - carboxy - 5' sulphophenylazo)naphthalene-3-sulphonic acid,
- The copper complex of 8-amino-1-hydroxy-2-[4'-(2'' - sulphophenylazo) - 2' - methoxy - 5' - methylphenylazo]-naphthalene-3,6-disulphonic acid,
- The copper complex of 6-amino-1-hydroxy-2-[4'-(2'',5'' - disulphophenylazo) - 2' - methoxy - 5'-methylphenylazo] - naphthalene-3,5 - disulphonic acid,
- The copper complex of 1-(3'-amino-4'-sulphophenyl) - 3 - methyl - 4 - [4'' - (2''',5''' - disulphophenylazo) - 2'' - methoxy - 5'' - methylphenylazo] - 5-pyrazolone,
- The copper complex of 7 - (4' - amino - 3' - sulphoanilino) - 1 - hydroxy - 2 - [4'' - (2''',5''' - disulphophenylazo) - 2" - methoxy - 5" - methylphenylazo]naphthalene-3-sulphonic acid, The copper complex of 6-(4'-amino-3'-sulphoanilino) - 1 - hydroxy - 2 - (2" - carboxyphenylazo)-naphthalene-3-sulphonic acid, The 1:2-chromium complex of 7-amino-6'-nitro-1,2'-dihydroxy - 2:1' - azonaphthalene - 3,4' - disulphonic acid, The 1:2-chromium complex of 6-amino-1-hydroxy-2 - (2' - carboxyphenylazo)naphthalene - 3 - sulphonic acid, The 1:2-chromium complex of 8-amino-1-hydroxy-2 - (4' - nitro - 2' - hydroxyphenylazo)naphthalene-3,6-disulphonic acid, The 1:2-cobalt complex of 6-(4'-amino-3'-sulphoanilino - 1 - hydroxy - 2 - (5" - chloro - 2" - hydroxyphenylazo)-naphthalene-3-sulphonic acid, The 1:2-chromium complex of 1-(3'-amino-4'-sulphophenyl) - 3 - methyl - 4) - 2" - hydroxy - 4"-sulpho-1"-naphthylazo)-5-pyrazolone, The 1:2-chromium complex of 7-(4'-sulphoanilino)-1 - hydroxy - 2 - (4" - amino - 2" - carboxyphenylazo)naphthalene-3-sulphonic acid, The 1:2-chromium complex of 1-(3'-aminophenyl)-3 - methyl - 4 - (4" - nitro - 2" - carboxyphenylazo)-5-pyrazolone.

In class 7:
   1 - amino - 4 - (3' - amino - 4' - sulphoanilino)anthraquinone-2-sulphonic acid,
   1 - amino - 4 - (4' - amino - 3' - sulphoanilino)anthraquinone-2,5-disulphonic acid,
   1 - amino - 4 - [4' - (4" - amino - 3" - sulphophenyl)-anilino]anthraquinone-2:5-disulphonic acid,
   1 - amino - 4 - [4' - (4" - amino - 2" - sulphophenylazo)anilino]-anthraquinone-2:5-disulphonic acid,
   1 - amino - 4 - (4' - methylamino - 3' - sulphoanilino)anthraquinone-2-sulphonic acid, In class 8:
   3 - (3' - amino - 4' - sulphophenyl)sulphamyl copper phthalocyanine-tri-3-sulphonic acid,
   Di - 4 - (3' - amino - 4' - sulphophenyl)sulphamyl copper phthalocyanine-di-4-sulphonic acid,
   3 - (3' - aminophenylsulphamyl) - 3 - sulphamyl-copper phthalocyanine-di-3-sulphonic acid.

In class 9:
   4 - amino - 2' - nitro - diphenylamine - 3,4' - disulphonic acid.

According to a further feature of the invention there is provided a modified process for the manufacture of the new dyestuffs, as herinbefore defined, which are azo dyestuffs containing at least one group of Formula I, as hereinbefore defined, which comprises diazotising a diazotisable primary amine and coupling the diazo compound so obtained with a coupling component, either the primary amine or the coupling component or both containing at least one group of Formula I.

This modified process of the invention may be conveniently brought about by adding sodium nitrite to a solution or suspension of the primary amine, which may be an aminoazo compound, in a dilute aqueous solution of hydrochloric acid, adding the diazo solution of suspension so obtained to an aqueous solution of the coupling component and filtering off the dyestuff which is precipitated. If necessary sodium chloride can be added to ensure complete precipitation of all the azo dyestuff.

Those primary amines and coupling components which contain at least one group of Formula I may be obtained by condensing the corresponding primary amine or coupling component containing at least one —AH group with a pyrimidine of Formula III.

According to a further feature of the invention there is provided a modified proces for the manufacture of the new dyestuffs, as hereinbefore defined, wherein one of $Y^1$ and $Y^2$ represents a chlorine or a bromine atom and the other $Y^1$ or $Y^2$ represents a —SCN group or a group of the formula:

$$-S.\overset{\overset{S}{\|}}{C}-N\diagup^{R'}_{R''}$$

wherein R' and R" have the meanings stated above, which comprises treating a new dyestuff, as hereinbefore defined, wherein both $Y^1$ and $Y^2$ represent chlorine or bromine atoms with a compound of the formula: W.SCN or $$W.S.\overset{\overset{S}{\|}}{C}-N\diagup^{R'}_{R''}$$

wherein R' and R" have the meanings stated above and W represents a hydrogen or a metal atom.

As examples of the metal atoms represented by W there may be mentioned alkali metal atoms such as sodium and potassium.

This modified process of the invention may be conveniently brought about by stirring the two reactants together in water, or in a water-miscible organic liquid or in a mixture of water and a water-miscible organic liquid, preferably at a temperature between 30° and 100° C., adding water and/or sodium chloride and isolating the dyestuff which is precipitated.

As examples of compounds of the formula: W.SCN or $$W.S\overset{\overset{S}{\|}}{C}-N\diagup^{R'}_{R''}$$

which may be used in this modified process of the invention there may be mentioned sodium thiocyanate, potassium thiocyanate, sodium diethyldithiocarbamate, sodium N-methyl-N-phenyldithiocarbamate, sodium N-ethyl-N-n-propyldithiocarbamate and potassium dimethyldithiocarbamate.

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phsophate and disodium hydrogen phosphate, citrates such as sodium citrate, borates, and alkali metal salts of dialkylmetanilic acid such as sodium diethylmetanilate, which are preferably used in conjunction with sodium hydrogen sulphate.

A preferred class of the new dyestuffs of the invention are the water-soluble dyestuffs which contain at least one carboxylic acid or sulphonic acid group and which contain one or two groups of the formula:

$$-\underset{R}{N}-\left[\begin{array}{c}N\\C\diagup\diagdown C\\|\phantom{xx}\|\\N\phantom{xx}C-CN\\\diagdown\diagup\\C\\|\end{array}\right]-(halogen)_m$$

wherein R has the meaning stated above, halogen represents a bromine or preferably a chlorine atom and m represents 1 or 2.

The new dyestuffs, as hereinbefore defined, are valuable for colouring natural and artificial textile materials for example textile materials comprising cotton, viscose rayon, regenerated cellulose, wool, silk, cellulose acetate, polyamides, polyacrylonitrile, modified polyacrylonitrile, and aromatic polyester fibres. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades possessing excellent fastness to wet treatments such as washing, and to light.

The new dyestuffs which contain water-solubilizing groups, for example sulphonic acid and carboxylic acid groups, which render them soluble in water are particularly valuable valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent can be used.

For example the cellulose textile material can be coloured by treating the cellulose textile material with an aqueous solution or suspension of the acid-binding agent and then immersing the so treated cellulose textile material in a dyebath comprising a solution of one or more of the new dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the new dyestuffs, as hereinbefore defined, which also contains an acid-binding agent, passing the so treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution of the one or more of the said dyestuffs which also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution of the one or more of the said dyestuffs can be applied to the cellulose textile material by a dyeing or a padding method and the coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution or suspension of the acid-binding agent or in the aqueous solution of the dyestuffs is not critical but it is preferred to use between 0.1% and 10% of the acid-binding agent based on the total weight of the said aqueous solutions or suspension. If desired the aqueous solution or suspension of the acid binding agent may also contain further substances, for example electrolytes such as sodium sulphate.

The aqueous solution of the one or more of the said dyestuffs may also contain substances which are known to assist the application of dyestuffs to textile materials, for example sodium chloride, sodium sulphate, urea, dispersing agents, surface active agents, sodium alginate or an emulsion of an organic liquid, for example trichloroethylene in water.

Alternatively the cellulose textile materials can be printed with a printing paste containing one or more of the new dyestuffs of the invention.

This may be conveniently brought about by applying a printing paste containing one or more of said dyestuffs to a cellulose textile material which has been impregnated with an acid-binding agent and thereafter subjecting the printed cellulose textile material to the action of heat or steam. Alternatively a printing paste containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C., before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsions, oil-in-water emulsions, surface active agents, sodium m-nitrobenzene sulphonate, and organic liquids, for example ethanol.

At the conclusion of the dyeing and/or printing processes it is preferred to subject the so coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

Those new dyestuffs which do not contain water-solubilising groups for example sulphonic acid, carboxylic acid, sulphonamide and acylsulphonamide groups are, in general, applied to textile materials in the form of an aqueous dispersion which may be obtained by gravel milling the dyestuff with water in the presence of a dispersing agent for example the sodium salt of sulphonated naphthalene formaldehyde condensation products, sulphosuccinic acid esters, Turkey red oil, alkyl phenol/ethylene oxide condensation products, soap and similar surface active materials with or without protective colloids such as dextrin, British gum and water-soluble proteins. If desired the aqueous paste of the dyestuff so obtained may be dried to form a re-dispersible powder which may be converted to a non-dusting powder by any of the processes known for forming non-dusting powders.

The new dyestuffs, as hereinbefore defined, can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface active cationic agents such as quaternary ammonium salts for example cetyl trimethylammonium bromide and cetyl pyridinium bromide and organic liquids such as n-butanol and benzyl alcohol.

Alternatively the new dyestuffs, as hereinbefore defined, can be applied to textile materials, which are preferably cellulose textile materials, in conjunction with a resin-forming composition and an acid catalyst, and this application may be conveniently carried out by treating the textile material wtih an aqueous solution containing (a) a new dyestuff, (b) a resin-forming composition and (c) an acid catalyst, optionally drying the so-treated textile material, and thereafter baking the textile material at a temperature above 100° C., preferably at a temperature between 130° and 170° C. The resulting coloured textile materials have excellent fastness to wet treatments such as washing and to perspiration and the coloured textile materials are resistant to creasing.

The resin-forming compositions present in the said aqueous solution are compositions known from the literature or used in practice for the production of textile materials having finishes resistant to creasing or to shrinking or of modified handle. As examples of such resin-forming compositions there may be mentioned epoxy resins, polyisocyanates, condensates of formaldehyde with cresols or with acrolein, and, in particular mixtures comprising the methylol derivatives or lower alkyl ethers of methylol derivatives of monomeric or polymeric compounds containing a plurality of amine or mono substituted amino groups, said compounds being known from the art or used in practice for the formation of resins by condensation with formaldehyde. Such compounds include, for example, monomeric nitrogen compounds such as urea, thiourea, substituted urea and thioureas, dicyandiamide, dicyandiamidine, biguanides, amides, carbamates, allophanates and heterocyclic compounds such as aminotriazines, urons, ureins, ureides, imidazolidones, triazones and hydantoins, or mixtures of such compounds, and polymeric nitrogen compounds such as the polymeric amides made by the reaction of dibasic acids with diamines. The lower alkyl ethers of the methylol derivatives of these compounds include for example the methyl, ethyl, propyl and butyl ethers.

The quantity of the resin-forming composition which is present in the aqueous solution usually amounts to between 3% and 30% by weight of the aqueous solution and is preferably between 5% and 20% by weight of the aqueous solution.

As examples of acid catalysts which may be present in the said aqueous solution there may be mentioned salts of weak bases and strong acids such as ammonium chloride, magnesium nitrate, zinc chloride, zinc sulphate and amine hydrochlorides, but a preferred class of acid catalysts are the mineral acid salts of primary or secondary organic amines which contain at least one alkyl chain carrying at least one hydroxy group. As examples of such primary or secondary organic amines there may be mentioned β-hydroxyethylamine,
N-methyl-N-(β-hydroxyethyl)amine,
N-ethyl-N-(β-hydroxyethyl)amine,
γ-hydroxypropylamine,
β-hydroxypropylamine,
β-, γ- or δ-hydroxy-n-butylamine,
N:N-di(β-hydroxyethyl)amine,
N:N-di(β-hydroxypropyl)amine,
N-(β-hydroxyethyl)-aniline,
N-(β-hydroxyethyl)-benzylamine,
β:γ-dihydroxypropylamine,
N-methylglucamine (also known as N-methyl-N-pentahydroxy-n-hexylamine),
N-ethylglucamine,
N-(β-hydroxyethyl)glucamine,
N-methyl-N-(β:γ-dihydroxypropyl)amine and
2-amino-1:2:3-propanetriol.

The quantity of the said acid catalyst present in the aqueous solution usually amounts to between 0.1% and 5.0% by weight of the said aqueous solution and is preferably between 0.25% and 2.0% by weight.

The invention is illustrated but not limited by the following examples in which the parts and percentages are by weight:

*Example 1*

A solution of 6 parts of 5-cyano-2:4:6-trichloropyrimidine in 80 parts of dioxan is added, with stirring, to a solution of 11.5 parts of the disodium salt of 2-(4'-amino-2'-methylphenylazo)naphthalene-4:8-disulphonic acid in 550 parts of water and the mixture is then stirred for 2 hours at a temperature between 40° and 50° C., the pH of the mixture being maintained between 6.5 and 7 by the addition of a 10% aqueous solution of sodium carbonate. 60 parts of sodium chloride are then added and the dyestuff which is precipitated is filtered off, washed with 20 parts of acetone and dried.

On analysis the dyestuff is found to contain 1.89 atoms of organically bound chlorine for each molecule of dyestuff. When applied to cellulose textile materials in conjunction with a treatment with an acid-binding agent the dyestuff yields reddish-yellow shades possessing very good fastness to washing and to light.

The 5-cyano-2:4:6-trichloropyrimidine used in the above example may be obtained as follows:

A mixture of 38.4 parts of barbituric acid, 144 parts of urea and 24.1 parts of potassium cyanate is stirred at a temperature of 150° C. for 3 hours. The mixture is cooled to 100° C., 240 parts of hot water are added, the mixture is then cooled to 50° C. and 75 parts of a concentrated aqueous solution of hydrochloric acid are added. The mixture is then cooled to 20° C. and the precipitated 5-carbonamidobarbituric acid is filtered off, washed with water and dried.

28 parts of dimethylaniline are added, with stirring, during 10 minutes to a mixture of 17.1 parts of 5-carbonamidobarbituric acid and 80 parts of phosphorus oxychloride and the mixture so obtained is then stirred at the boil under a reflux condenser for 45 minutes. The mixture is then cooled to 20° C. poured on to ice and the precipitated 5-cyano-2:4:6-trichloropyrimidine is filtered off, washed with water and dried. The 5-cyano-2:4:6-trichloropyrimidine can be purified by sublimation at a temperature of 110° C. and at a pressure of 0.1 mm. of mercury. The pure compound has a melting point between 119° and 121° C.

*Example 2*

19.7 parts of copper phthalocyanine-3-sulphon-N-(4'-aminophenyl)amide - 3 - sulphonamide - 3 - sulphonic acid (which may be obtained as described below) are suspended in 900 parts of water and a 2 N aqueous solution of sodium hydroxide is added until a clear solution is obtained and the pH of the solution is 7. The solution is cooled to between 15° and 20° C. and a solution of 4.5 parts of 5-cyano-2:4:6-trichloropyrimidine in 100 parts of dioxan is then added. The mixture is stirred for ½ hour at a temperature between 15° and 20° C. whilst maintaining the pH of the mixture between 6 and 7 by the addition of a 2 N aqueous solution of sodium hydroxide. 100 parts of sodium chloride are then added and the precipitated dyestuff is filtered off and dried.

When applied to cellulose textile materials by a printing process in conjunction with a treatment with an acid-binding agent the dyestuff yields bright greenish-blue prints possessing excellent fastness to wet treatments.

The copper phthalocyanine-3-sulphon-N-(4'-aminophenyl)amide-3-sulphonamide-3-sulphonic acid used in the above example may be obtained as follows:

115.2 parts of copper phthalocyanine are slowly added with stirring to 540 parts of chlorosulphonic acid and the mixture is then stirred for 3 hours at a temperature between 140° and 145° C. The mixture is cooled to 80° C., 100 parts of thionyl chloride are added and the mixture is then stirred for 2 hours at a temperature of 85° C. The mixture is cooled to 20° C., poured on to ice and the precipitated phthalocyanine sulphonchloride is filtered off and washed with 1000 parts of a 1% aqueous solution of hydrochloric acid which has been cooled to 0° C.

The solid sulphonchloride so obtained is stirred with 1000 parts of water and 600 parts of ice and 30 parts of p-aminoacetanilide are then added. The pH of the resultant mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of ammonium hydroxide. The mixture is then stirred at a temperature of 50° C. until no further additions of ammonium hydroxide solution are required to maintain the pH at 8. 500 parts of a concentrated aqueous solution of hydrochloric acid are then added and the mixture is stirred for 3 hours at a temperature of 90° C. The mixture is then cooled to 20° C. and the precipitated solid is filtered off, washed with a 1% aqueous solution of hydrochloric acid and dried.

*Example 3*

A solution of 5.5 parts of 2-methyl-5-cyano-4:6-dichloropyrimidine in 80 parts of dioxan is added with stirring to a solution of 11.5 parts of the disodium salt of 2-(4' - amino - 2' - methylphenylazo)naphthalene - 4:8-disulphonic acid in 550 parts of water and the mixture is then stirred for 3½ hours at a temperature between 70° and 90° C., the pH of the mixture being maintained between 6.5 and 7 by the addition of a 10% aqueous solution of sodium carbonate. The precipitated dyestuff is then filtered off, washed with 20 parts of acetone and dried.

On analysis the dyestuff is found to contain 0.82 atom of hydrolysable chlorine for each molecule of dyestuff. When applied to cellulose textile materials in conjunction with a treatment with an acid-binding agent the dyestuff yields reddish-yellow shades possessing very good fastness to washing and to light.

The 2-methyl-5-cyano-4:6-dichloropyrimidine used in the above example may be obtained by heating a mixture of 2-methyl-4:6-dihydroxypyrimidine, urea and potassium cyanate to give 2-methyl-4:6-dihydroxy-5-carbonamidopyrimidine which on heating with phosphorus oxychloride, as described in volume 48 of Chemicke Listy at pages 1364 to 1369, yields 2-methyl-5-cyano-4:6-dichloropyrimidine.

*Example 4*

In place of the 4.5 parts of 5-cyano-2:4:6-trichloropyrimidine used in Example 2 there are used 3.9 parts of 2-methyl-5-cyano-4:6-dichloropyrimidine or 4.0 parts of 5-carboxy-2:4-dichloropyrimidine (which may be obtained as described in volume 20 of the Journal of Organic Chemistry at page 837) or 4.4 parts of 5-carbomethoxy-4:6-dichloropyrimidine (which may be obtained as described in volume 20 of the Journal of Organic Chemistry at page 837) or 3.8 parts of 5-cyano-2:4-dichloropyrimidine or 7.0 parts of 5-cyano-2:4:6-tribromopyridine when similar dyestuffs are obtained.

The 5-cyano-2:4-dichloropyrimidine used in the above example may be obtained as follows:

49 parts of diethylaniline are added, during 15 minutes, to a mixture of 25 parts of 5-cyanouracil and 42 parts of phosphorus oxychloride and the resulting mixture is stirred for 2 hours at the boil under a reflux condenser. The mixture is then cooled to 20° C., poured on to ice and the resulting aqueous mixture is extracted 5 times using 200 parts of ether for each extraction. The ether extracts are then washed with water, then with an aqueous solution of sodium bicarbonate, and finally dried. The resulting solution is then distilled when 5-cyano-2:4-dichloropyrimidine distills between 136° and 138° C. at a pressure of 23 mms. The product so obtained melts at 62° to 63° C.

The 5-cyano-2:4:6-tribromopyrimidine used in the above examples may be obtained as follows:

30 parts of ethylaniline are added, during 30 minutes, to a mixture of 10 parts of 5-carbonamidobarbituric acid and 90 parts of phosphorus oxybromide at a temperature between 50° and 60° C., and the resulting mixture is then stirred for 2 hours at a temperature between 110° and 120° C. The mixture is then cooled to 20° C., poured on to ice and the precipitated 5-cyano-2:4:6-tribromopyrimidine is filtered off, washed with water and dried. After crystallisation from a petroleum ether (which boils between 100° and 120° C.) the product melts at 212° to 214° C.

*Example 5*

A solution of 9 parts of 5-cyano-2:4:6-trichloropyrimidine in 50 parts of dioxan is added, with stirring, to a solution of 16.6 parts of the disodium salt of 4-amino-2'-nitrodiphenylamine-3:4'-disulphonic acid in 500 parts of water and the resulting mixture is stirred at 20° C. until no further additions of an aqueous solution of sodium hydroxide are required to maintain the pH between 6 and 7. 125 parts of sodium chloride are then added and the precipitated dyestuff is filtered off and dried.

When applied to cellulose textile materials in conjunction with a treatment with an acid-binding agent the dyestuff yields yellow shades which possess excellent fastness to wet treatments.

*Example 6*

A solution of 4.4 parts of sodium diethyldithiocarbamate and 17.4 parts of the dyestuff of Example 5 in 450 parts of water is stirred for 1½ hours at a temperature between 30° and 35° C. 125 parts of potassium chloride are added, the mixture is cooled to 20° C. and the precipitated dyestuff is then filtered off and dried.

On analysis the dyestuff is found to contain 7 nitrogen atoms, 4 sulphur atoms and 1 chlorine atom per molecule of dyestuff.

When applied to cellulose textile materials in conjunction with a treatment with an acid-binding agent the dyestuff yields yellow shades possessing excellent fastness to wet treatments.

*Example 7*

A solution of 9.0 parts of sodium diethyldithiocarbamate and 22 parts of the dyestuff of Example 2 in 800 parts of water is stirred for 45 minutes at a temperature of 60° C. 100 parts of sodium chloride are then added and the precipitated dyestuff is filtered off and dried.

When applied to cellulose textile materials in conjunction with a treatment with an acid-binding agent the dyestuff yields blue shades possessing excellent fastness to light and to wet treatments.

*Example 8*

A solution of 12.7 parts of the trisodium salt of 1-amino - 4 - (4' - aminoanilino)anthraquinone - 2:3':5-trisulphonic acid in 200 parts of water is added, during 20 minutes, to a solution of 4.22 parts of 5-carbomethoxy- 2:4-dichloropyrimidine in a mixture of 100 parts of dioxan and 50 parts of water. The mixture is stirred for 90 minutes at a temperature of 40° C., the pH being maintained between 5 and 6 by the gradual addition of a 2 N aqueous solution of sodium carbonate and the mixture is then stirred for 3 hours at 50° C. 20 parts of sodium chloride are added and the precipitated dyestuff is filtered off, washed with a solution of 10 parts of sodium chloride in 200 parts of water, then with 100 parts of acetone, and finally dried.

When applied to cellulose textile materials in conjunction with a treatment with an acid-binding agent the dyestuff yields blue shades possessing excellent fastness to wet treatments.

*Example 9*

A solution of 12.7 parts of the trisodium salt of 1-amino - 4 - (4' - aminoanilino)anthraquinone - 2:3':5-trisulphonic acid in 200 parts of water is added with stirring to a solution of 4.27 parts of 5-cyano-2:4:6-trichloropyrimidine in a mixture of 100 parts of dioxan and 50 parts of water and the resulting mixture is stirred for 1 hour at 20° C., the pH of the mixture being maintained between 5 and 6 by the addition of a 2 N aqueous solution of sodium carbonate, 40 parts of sodium chloride are then added and the precipitated dyestuff is filtered off, washed with a 10% aqueous solution of sodium chloride and dried.

On analysis the dyestuff is found to contain 2 chlorine atoms and 6 nitrogen atoms per molecule of dyestuff.

When applied to cellulose textile materials in conjunction with a treatment with an acid-binding agent the dyestuff yields blue shades possessing excellent fastness to wet treatments.

The following table gives further examples of the new dyestuffs of the invention which are obtained when the 12.7 parts of the trisodium salt of the anthraquinone compound used in Examples 8 or 9 are replaced by equivalent amounts of the sodium salts of the anthraquinone compounds listed in the second column of the table and/or the 4.22 parts of 5-carbomethoxy-2:4-dichloropyrimidine used in Example 8 or the 4.27 parts of 5-cyano-2:4:6-trichloropyrimidine used in Example 9 are replaced by equivalent amounts of the pyrimidines listed in the third column of the table. The fourth column of the table indicates the shades obtained when the dyestuffs are applied to cellulose textile materials in conjunction with a treatment with an acid-binding agent.

aqueous suspension of diazotised 4-aminoanisole-3-sulphonic acid (which is obtained by diazotising an aqueous solution containing 5.5 parts of sodium 4-aminoanisole-3-sulphonate by known methods) is then added during 5 minutes. The resulting mixture is then stirred for 1½ hours at 5° C. and the precipitated dyestuff is filtered off, washed with acetone and dried. On analysis the dyestuff is found to contain 1.82 atoms of organically bound chlorine per molecule of dyestuff. When applied to cellulose textile materials in conjunction with a treatment with an acid-binding agent the dyestuff yields scarlet shades possessing very good fastness to wet treatments.

*Example 23*

A solution of 5.5 parts of 5-cyano-2:4:6-trichloropyrimidine in a mixture of 40 parts of acetone and 40 parts of dioxan is added to a solution of 5.2 parts of sodium m-phenylenediamine sulphonate in 150 parts of water and the resulting mixture is stirred for 1 hour at 40° C., the pH of the mixture being maintained between 6.5 and 7 by the addition of a 10% aqueous solution of sodium carbonate. The resulting solution is then cooled to 5° C., and 8 parts of a concentrated aqueous solution of hydrochloric acid are added followed by a solution of 1.7 parts of sodium nitrite in 10 parts of water. The resulting mixture is stirred for 5 minutes and is then added to a solution of 8.2 parts of the disodium salt of 1-(4'-sulphophenyl)-3-carboxy-5-pyrazolone in 50 parts of water at a temperature of 5° C., the pH of the mixture being maintained at 7.5 by the simultaneous addition of a 10% aqueous solution of sodium carbonate. The mixture is then stirred for 30 minutes, 50 parts of sodium chloride are added and the precipitated dyestuff is filtered off and dried.

On analysis the dyestuff is found to contain 1.85 atoms of organically bound chlorine per molecule of dyestuff. When applied to cellulose textile materials in conjunction with a treatment with an acid-binding agent the dyestuff yields greenish-yellow shades possessing very good fastness to wet treatments and to light.

*Example 24*

A solution of 5.1 parts of 5-cyano-2:4-dichloropyrimidine in 50 parts of acetone is added with stirring to a solution of 14.5 parts of the trisodium salt of 1-(3'-aminophenyl)-3-carboxy-4-(1":5"-disulphonaphth - 2"-ylazo)-5-pyrazolone in 250 parts of water, and the resulting mix-

| Ex. | Anthraquinone compound | Pyrimidine | Shade |
|---|---|---|---|
| 10 | 1-amino-4-(4'-aminoanilino)anthraquinone-2:3':5-trisulphonic acid | 2-methyl-5-cyano-4:6-dichloropyrimidine | Blue. |
| 11 | ----do---- | 5-cyano-2:4-dichloropyrimidine | Do. |
| 12 | ----do---- | 5-cyano-2:4:6-tribromopyrimidine | Do. |
| 13 | 1-amino-4-(4'-aminoanilino)anthraquinone-2:3'-disulphonic acid | ----do---- | Do. |
| 14 | ----do---- | 5-cyano-2:4:6-trichloropyrimidine | Do. |
| 15 | 1-amino-4-(3'-aminoanilino)anthraquinone-2:4'-disulphonic acid | ----do---- | Do. |
| 16 | Mixture of 1-amino-4[4'-(4"-aminophenylazo)anilino]anthraquinone-2:2":5- and -2:2":8-trisulphonic acids. | ----do---- | Olive green. |
| 17 | ----do---- | 5-cyano-2:4-dichloropyrimidine | Do. |
| 18 | ----do---- | 2-methyl-5-cyano-4:6-dichloropyrimidine | Do. |
| 19 | Mixture of 1-amino-4-[4'-{β-(4"-aminophenyl)vinyl}anilino]anthraquinone-2:2":3':5- and -2:2":3':8-tetrasulphonic acids. | ----do---- | Green. |
| 20 | Mixture of 1-amino-4-[4'-{β-(4"-aminophenyl)vinyl}anilino]anthraquinone-2:2":3':5- and -2:2":3':8-tetrasulphonic acids. | 5-cyano-2:4:6-trichloropyrimidine | Do. |
| 21 | ----do---- | 5-cyano-2:4:6-tribromopyrimidine | Do. |

*Example 22*

A solution of 5.6 parts of 5-cyano-2:4:6-trichloropyrimidine in a mixture of 30 parts of dioxan and 30 parts of acetone is added, with stirring, to a solution of 6.5 parts of sodium 2-amino-5-naphthol-7-sulphonate in 150 parts of water and the resulting mixture is then stirred for 1 hour at a temperature between 40° and 50° C., the pH of the mixture being maintained between 6.5 and 7 by the addition of a 10% aqueous solution of sodium carbonate. The resulting solution is cooled to 5° C., and an ture is then stirred for 2 hours at 25° C., the pH of the mixture being maintained between 6.5 and 7 by the addition of a 10% aqueous solution of sodium carbonate. The dyestuff which is precipitated is then filtered off, washed with acetone and dried.

On analysis the dyestuff is found to contain 1.09 atoms of organically bound chlorine per molecule of dyestuff. When applied to cellulose textile materials in conjunction with a treatment with an acid-binding agent the dyestuff yields greenish-yellow shades possessing very good fastness to washing and to light.

Example 25

A solution of 2.3 parts of 5-carbomethoxy-2:4-dichloropyrimidine in a mixture of 20 parts of acetone and 20 parts of dioxan is added with stirring to a solution of 5.99 parts of the trisodium salt of 1-(3'-aminophenyl)-3-carboxy-4-(1":5" - disulphonaphth - 2" - ylazo)-5-pyrazolone in 150 parts of water and the resulting mixture is then stirred for 3 hours at a temperature between 28° and 32° C., the pH of the mixture being maintained between 6.5 and 7 by the addition of a 10% aqueous solution of sodium carbonate. 15 parts of sodium chloride are then added and the precipitated dyestuff is filtered off, washed with acetone and dried.

On analysis the dyestuff so obtained is found to contain 1.05 atoms of organically bound chlorine per molecule of dyestuff. When applied to cellulose textile materials in conjunction with a treatment with an acid-binding agent the dyestuff yields greenish-yellow shades which possess very good fastness to washing and to light.

The following table gives further examples of the new dyestuffs of the invention which are obtained when the sodium salts of the aminoazo compounds used in Examples 1, 3, 24 or 25 are replaced by equivalent amounts of the sodium salts of the aminoazo compounds listed in the second column of the table and/or the pyrimidines used in Examples 1, 3, 24 or 25 are replaced by equivalent amounts of the pyrimidines listed in the third column of the table. The fourth column of the table indicates the shades obtained when the dyestuffs are applied to cellulose textile materials in conjunction with a treatment with an acid-binding agent.

| Ex. | Aminoazo compound | Pyrimidine | Shade obtained on cellulose textile materials |
|---|---|---|---|
| 26 | 2-amino-6-(2'-sulphophenylazo)-5-naphthol-7-sulphonic acid | 5-cyano-2:4:6-trichloropyrimidine | Orange. |
| 27 | 2-amino-7-(2'-sulphophenylazo)-8-naphthol-6-sulphonic acid | do | Do. |
| 28 | 1 - (2':5' - dichloro - 4' - sulphophenyl) - 3 - methyl - 4 - (3" - amino-6"-sulphophenylazo)-5-pyrazolone. | do | Yellow. |
| 29 | 1-(2'-chloro-5'-sulphophenyl)-3-methyl-4-(3"-amino-6"-sulphophenylazo)5-pyrazolone. | do | Do. |
| 30 | 2-amino-6-(2'-sulpho-4'-methoxyphenylazo)-5-naphthol-7-sulphonic acid | do | Scarlet. |
| 31 | 2-amino-7-(2'-sulpho-4'-methoxyphenylazo)-8-naphthol-6-sulphonic acid | 5-cyano-2:4:6-tribromopyrimidine | Red. |
| 32 | 2-methylamino-7-(2'-sulpho-4'-methoxyphenylazo)-8-naphthol-6-sulphonic acid. | do | Red. |
| 33 | 2-amino-5-hydroxy-6:2'-azonaphthalene-7:1':5'-trisulphonic acid | 5-cyano-2:4:6-trichloropyrimidine | Orange. |
| 34 | 2-methylamino-5-hydroxy-6:2'-azonaphthalene-7:1':5'-trisulphonic acid | do | Do. |
| 35 | 1:2-chromium complex of 2-amino-6-(2'-carboxyphenylazo)-5-naphthol-7-sulphonic acid. | do | Brown. |
| 36 | 1:2-chromium complex of 2-amino-6-(2'-carboxyphenylazo)-5-naphthol-7-sulphonic acid. | 5-cyano-2:4-dichloropyrimidine | Do. |
| 37 | do | 2-methyl-5-cyano-4:6-dichloropyrimidine | Do. |
| 38 | do | 5-carboxy-2:4-dichloropyrimidine | Do. |
| 39 | 4-nitro-4'-(4"-N-methylaminophenylazo)-stilbene-2:2'-disulphonic acid | 5-cyano-2:4:6-trichloropyrimidine | Reddish-yellow. |
| 40 | 1:2-chromium complex of 6-amino-1:2'-dihydroxy-6'-nitro-2:1'-azonaphthalene-3:4'-disulphonic acid. | do | Black. |
| 41 | 2-(3'-amino-6'-sulphophenylazo)-1-naphthol-3:6-disulphonic acid | 5-cyano-2:4:6-trichloropyrimidine | Reddish-orange. |
| 42 | 2-amino-6-(3'-amino-6'-sulphophenylazo)-5-naphthol-7-sulphonic acid | 5-cyano-2:4:6-tribromopyrimidine | Orange. |
| 43 | 2 - amino - 6 - [2'-sulpho-4'-(4"-sulphophenylazo) phenylazo] - 5 - naphthol-sulphonic acid. | do | Red. |
| 44 | 2-amino-5-hydroxy-6:2'-azonaphthalene-7:4':8'-trisulphonic acid | do | Scarlet. |
| 45 | 2-amino-5-hydroxy-6:2'-azonaphthalene-7:5':7'-trisulphonic acid | do | Do. |
| 46 | 2-(4'-amino-3'-sulphophenylamino)-6-[2"-sulpho-4"-(p-sulphophenylazo) phenylazo]-5-naphthol-7-sulphonic acid. | do | Violet. |
| 47 | 2-amino-7-(3'-amino-6'-sulphophenylazo)-8-naphthol-6-sulphonic acid | 5-cyano-2:4-dichloropyrimidine | Reddish-orange. |
| 48 | 2-amino-8-hydroxy-6:4':8'-trisulphonic acid | do | Red. |
| 49 | 2-amino-8-hydroxy-7:2'-azonaphthalene-6:1':5'-trisulphonic acid | 5-cyano-2-methyl-4:6-dichloropyrimidine | Red. |
| 50 | 1-amino-7-(3'-sulphophenylazo)-8-naphthol-3:6-disulphonic acid | 5-cyano-2:4:6-trichloropyrimidine | Bluish-red. |
| 51 | 1-amino-7-(2'-sulpho-4'-chlorophenylazo)-8-naphthol-3:6-disulphonic acid | do | Do. |
| 52 | 1-amino-7-(2'-sulpho-4'-methoxyphenylazo)-8-naphthol-3:6-disulphonic acid | do | Rubine. |
| 53 | 1-amino-7-(3'-amino-6'-sulphophenylazo)-8-napthol-3:6-disulphonic acid | do | Bluish-red. |
| 54 | 1-amino-7-(2'-sulphophenylazo)-8-naphthol-4:6-disulphonic acid | do | Red. |
| 55 | 1-amino-8-hydroxy-7:2'-azonaphthalene-3:6:1'-trisulphonic acid | do | Rubine. |
| 56 | 1-amino-7-(4'-sulphophenylazo)-8-naphthol-4:6-disulphonic acid | do | Bluish-red. |
| 57 | 2-(2'-acetylamino-4'-aminophenylazo)-naphthalene-4:8-disulphonic acid | 2-methyl-5-cyano-4:6-dichloropyrimidine | Reddish-yellow. |
| 58 | 2-(2'-methyl-4'-aminophenylazo)naphthalene-5:7-disulphonic acid | 5-cyano-2:4-dichloropyrimidine | Do. |
| 59 | 2-[2'-methyl-4'-(4"-amino-2"-methylphenylazo)phenylazo]naphthalene-4:8-disulphonic acid. | do | Brownish-orange. |
| 60 | 1-(2'-sulphophenyl)-3-methyl-4-(3"-amino-6"-sulphophenylazo)-5-pyrazolone. | 5-cyano-2:4:6-tribromopyrimidine | Yellow. |
| 61 | 1-(3'-amonophenyl-3-methyl-4-(1":5"-disulphonaphthyl-2"-azo)-5-pyrazolene. | 5-cyano-2:4:6-trichloropyrimidine | Do. |
| 62 | 1-(4'-aminophenyl)-3-methyl-4-(1":5"-disulphonaphthyl-2"-azo)-5-pyrazolone. | do | Do. |
| 63 | 1-(3'-amino-4'-sulphophenyl)-3-methyl-4-(1"-sulphonaphthyl-2"-azo)-5-pyrazolone. | do | Do. |
| 64 | 1-(4':8'-disulphonaphth-2'-yl)-3-methyl-4-(3"-amino-6"-sulphophenylazo)-5-pyrazolone. | do | Do. |
| 65 | 1-(3'-amino-6'-sulphophenylazo)-2-naphthol-6-sulphonic acid | do | Orange. |
| 66 | 1-(3'-amino-6'-sulphophenylazo)-2-naphthol-6:8-disulphonic acid | do | Do. |
| 67 | 2-(3'-amino-6'-sulphophenylazo)-1-naphthol-3-sulphonic acid | do | Do. |
| 68 | 2-(3'-amino-6'-sulphophenylazo)-1:8-dihydroxynaphthalene-3:6-disulphonic acid. | do | Bluish-red. |
| 69 | 1-(3'-amino-6'-sulphophenylazo)-2-amino-8-naphthol-6-sulphonic acid | do | Red. |
| 70 | 1-acetylamino-7-(3'-amino-6'-sulphophenylazo)-8-naphthol-3:6-disulphonic acid. | do | Red. |
| 71 | 1-acetylamino-7-(3'-amino-6'-sulphophenylazo)-8-naphthol-4:6-disulphonic acid. | do | Red. |
| 72 | 1-benzoylamino-7-(3'-amino-6'-sulphophenylazo)-8-naphthol-3:6-disulphonic acid. | do | Red. |
| 73 | 2-propionylamino-6-(3'-amino-6'-sulphophenylazo)-5-naphthol-7-sulphonic acid. | do | Yellowish-red. |
| 74 | 2-benzoylamino-6-(3'-amino-6'-sulphophenylazo)-5-naphthol-7-sulphonic acid | 5-cyano-2:4:6-tribromopyrimidine | Do. |
| 75 | 2-amino-7-(3'-amino-6'-sulphophenylazo)-8-naphthol-6-sulphonic acid | do | Do. |
| 76 | 1-(4'-amino-2'-sulphophenylazo)-2-naphthol-8-sulphonic acid | 5-cyano-2:4:6-trichloropyrimidine | Red. |
| 77 | 2-acetylamino-6-(4'-amino-2'-sulphophenylazo)-5-naphthol-7-sulphonic acid | do | Yellowish-red. |
| 78 | 2-acetylamino-7-(4'-amino-2'-sulphophenylazo)-8-naphthol-6-sulphonic acid | do | Red. |
| 79 | 1-(4'-amino-2'-sulphophenylazo)-2-amino-8-naphthol-6-sulphonic acid | 5-cyano-2:4-dichloropyrimidine | Bluish-red. |
| 80 | 1-acetylamino-7-(4'-amino-2'-sulphophenylazo)-8-naphthol-3:6-disulphonic acid. | 5-carboxy-2:4-dichloropyrimidine | Violet. |
| 81 | 1-benzoylamino-7-(4'-amino-2'-sulphophenylazo)-8-naphthol-4:6-disulphonic acid. | 5-carbomethoxy-2:4-dichloropyrimidine | Bordeaux. |
| 82 | 1-(3'-aminophenyl)-3-methyl-4-(2":5"-disulphophenylazo)-5-pyrazolone | 5-cyano-2:4:6-trichloropyrimidine | Yellow. |
| 83 | 1-(3'-aminobenzoylamino)-7-(2"-sulphophenylazo)-8-naphthol-3:6-disulphonic acid. | do | Red. |
| 84 | 1-(4'-aminosulphonaphth-1'-ylazo)-4- (8"-sulphonaphth-1"-ylazo)naphthalene sulphonic acid. | do | Reddish-brown. |
| 85 | 1-amino-2-(4'-aminophenylazo)-7-(4"-sulphophenylazo)-8-naphthol-3:6-disulphonic acid. | do | Green. |

| Ex. | Aminoazo compound | Pyrimidine | Shade obtained on cellulose textile materials |
|---|---|---|---|
| 86 | 1-(4'-aminobenzoylamino)-7-(2''-sulphophenylazo)-8-naphthol-3:6-disulphonic acid. | 5-cyano-2:4:6-trichloropyrimidine | Red. |
| 87 | 1-amino-7-(2'-sulphophenylazo)-8-naphthol-3:6-disulphonic acid | do | Bluish-red. |
| 88 | do | 5-cyano-2:4:6-tribromopyrimidine | Do. |
| 89 | 1-amino-7-(phenylazo)-8-naphthol-3:6-disulphonic acid | 5-cyano-2:4:6-trichloropyrimidine | Bluish-red. |
| 90 | 2-amino-6-[2'-methoxy-5'-methyl-4'-(2'':5''-disulphophenylazo)phenylazo]-5-naphthol-1:7-disulphonic acid. | do | Bluish violet. |
| 91 | 1:2-cobalt complex of 6-amino-1:2'-dihydroxy-6'-nitro-2:1-azonaphthalene-3:4'-disulphonic acid. | do | Brownish grey. |
| 92 | 1-(3'-aminophenyl)-3-carboxy-4-(1'':5''-disulphonaphth-2''-ylazo)-5-pyrazolene. | 5-carboxy-2:4-dichloropyrimidine | Yellow. |
| 93 | 1-amino-7-[4'-(2''-sulphophenylazo)-2'-methoxy-5'-methylphenylazo]-8-naphthol-3:6-disulphonic acid. | 5-cyano-2:4:6-trichloropyrimidine | Blue. |
| 94 | 1-amino-7-[4-(2''-hydroxy-3'':6''-disulphophenylazo)-2':5'-dimethoxyphenylazo]-8-naphthol-3:6-disulphonic acid. | do | Do. |
| 95 | 1-amino-7-[4'-(2''-sulphophenylazo)-2'-methoxyphenylazo]-8-naphthol-3:6-disulphonic acid. | do | Do. |
| 96 | 1-amino-7-[4'-(4'':8''-disulphonaphth-2''-ylazo)-2'-carboxyphenylazo]-8-naphthol-3:6-disulphonic acid. | do | Violet. |
| 97 | 2-amino-7-[4'-(2''-sulphophenylazo)-2'-methoxy-5'-methylphenylazo]-8-naphthol-3:6-disulphonic acid. | do | Do. |
| 98 | 1-(4'-sulpho-3'-aminophenyl)-3-carboxy-4-[4''-(2''':5'''-disulphophenylazo)-2''-methoxy-5''-methylphenylazo]-5-pyrazolone. | do | Red. |
| 99 | Copper complex of 1-amino-7-[4'-(2''-sulphophenylazo)-2'-methoxy-5'-methylphenylazo]-8-naphthol-3:6-disulphonic acid. | do | Blue. |
| 100 | Copper complex of 1-amino-7-[4'-(2''-sulphophenylazo)-2'-methoxyphenylazo]-8-naphthol-3:6-disulphonic acid. | do | Do. |
| 101 | Copper complex of 1-amino-7-[4'-(4'':8''-disulphonaphth-2''-ylazo)-2'-carboxyphenylazo]-8-naphthol-3:6-disulphonic acid. | do | Do. |
| 102 | Copper complex of 2-amino-7-[4'-(2''-sulphophenylazo)-2'-methoxy-5'-methylphenylazo]-8-naphthol-3:6-disulphonic acid. | do | Do. |
| 103 | Copper complex of 2-amino-6-[4'-(2''-sulphophenylazo)-2'-methoxy-5'-methylphenylazo]-5-naphthol-1:7-disulphonic acid. | do | Navy blue. |
| 104 | Copper complex of 2-amino-6-[4'-(2'':5''-disulphophenylazo)-2'-methoxy-5'-methylphenylazo]-5-naphthol-1:7-disulphonic acid. | do | Do. |
| 105 | Copper complex of 2-(4'-amino-3'-sulphophenylamino)-7-[4''-(2''':5'''-disulphophenylazo)-2''-methoxy-5''-methylphenylazo]-8-naphthol-6-sulphonic acid. | do | Grey. |
| 106 | Copper complex of 4:4'-bis(1''-hydroxy-8''-amino-3'':6''-disulphonaphth-2''-ylazo)-3:3'-dimethoxydiphenyl. | do | Blue. |
| 107 | Copper complex of 1-amino-7-[4'-(4'':8''-disulphonaphth-2''-ylazo)-2':2'-dimethoxyphenylazo]-8-naphthol-3:6-disulphonic acid. | do | Do. |
| 108 | Copper complex of 4-(6''-amino-1''-hydroxynaphth-2''-ylazo)-4'-(1'''-hydroxynaphth-2'''-ylazo)-3:3'-dimethoxydiphenyl-3'':3''':6'':8'''-tetrasulphonic acid. | do | Do. |
| 109 | Copper complex of 1-N-ethylamino-7-[4'-(2'':5''-disulphophenylazo)-2':5'-dimethoxyphenylazo]-8-naphthol-3:6-disulphonic acid. | do | Do. |
| 110 | Copper complex of 2-N-methylamino-6-[4'-(2'':5''-disulphophenylazo)-2':5'-dimethoxyphenylazo]-5-naphthol-7-sulphonic acid. | do | Do. |
| 111 | Copper complex of 2-N-ethylamino-6-[4'-(2'':5''-disulphophenylazo)-2':5'-dimethoxyphenylazo]-5-naphthol-7-sulphonic acid. | do | Do. |
| 112 | Copper complex of 2-amino-6-[4'-(2'':5''-disulphophenylazo)-2':5'-dimethoxyphenylazo]-5-naphthol-1:7-disulphonic acid. | do | Navy blue. |
| 113 | Copper complex of 2-amino-6-[4'-(5'':7''-disulphonaphth-2''-ylazo)-2':5'-dimethoxyphenylazo]-5-naphthol-1:7-disulphonic acid. | do | Do. |
| 114 | Copper complex of 2-(4'-amino-3'-sulphophenylamino)-7-[4''-(o-sulphophenylazo)-2''-methoxy-5''-methylphenylazo]-8-naphthol-6-sulphonic acid. | do | Grey. |
| 115 | Copper complex of 2-(4'-amino-3'-sulphophenylamino)-6-(2''-carboxyphenylazo)-5-naphthol-7-sulphonic acid. | 5-cyano-2:4:6-tribromopyrimidine | Rubine. |
| 116 | Copper complex of 1-amino-7-(2'-hydroxy-5'-sulphophenylazo)-8-naphthol-3:6-disulphonic acid. | do | Violet. |
| 117 | Copper complex of 2-(4'-amino-3'-sulphophenylamino)-7-[4''-(2''':5'''-disulphophenylazo)-2'':5''-dimethoxyphenylazo]-8-naphthol-6-sulphonic acid. | do | Grey. |
| 118 | Copper complex of 1-N-phenylamino-7-[4'-(4''-amino-2''-sulphophenylazo)-2'-methoxy-5'-methylphenylazo]-8-naphthol-3:6-disulphonic acid. | 5-cyano-2:4:6-trichloropyrimidine | Green. |
| 119 | Copper complex of 1-amino-7-(2'-hydroxy-3'-chloro-5'-sulphophenylazo)-8-naphthol-3:6-disulphonic acid. | do | Purple. |
| 120 | Copper complex of 2-amino-6-(2'-hydroxy-5'-sulphophenylazo)-5-naphthol-7-sulphonic acid. | do | Rubine. |
| 121 | Copper complex of 2-amino-6-(2'-hydroxy-3':5'-disulphophenylazo)-5-naphthol-7-sulphonic acid. | do | Do. |
| 122 | Copper complex of 2-amino-6-(2'-hydroxy-5'-sulphophenylazo)-5-naphthol-1:7-disulphonic acid. | do | Do. |
| 123 | Copper complex of 2-N-methylamino-6-(2'-carboxy-5'-sulphophenylazo)-5-naphthol-7-sulphonic acid. | do | Orange-brown. |
| 124 | Copper complex of 2-(β-aminoethylamino)-6-[4'-(2'':5''-disulphophenylazo)-2':5'-dimethoxyphenylazo]-5-naphthol-7-sulphonic acid. | do | Blue. |
| 125 | 1-(2':5'-disulphophenyl)-3-methyl-4-(3''-amino-6''-sulphophenylazo)-5-pyrazolone. | do | Greenish-yellow. |
| 126 | 2-amino-1-(3'-amino-6'-sulphophenylazo)-naphthalene-5:7-disulphonic acid | do | Reddish-yellow. |
| 127 | 1-amino-7-(4'-methyl-2'-sulphophenylazo)-8-naphthol-3:6-disulphonic acid | do | Red. |
| 128 | 1-(4'-sulphophenyl)-3-carboxy-4-(3''-amino-6''-sulphophenylazo)-5-pyrazolone. | do | Greenish-yellow. |
| 129 | 1:2-chromium complex of 1-amino-7-(2'-hydroxy-5'-nitrophenylazo)-8-naphthol-3:6-disulphonic acid. | do | Grey. |
| 130 | 1:2-cobalt complex of 1-amino-7-(2'-hydroxy-5'-nitrophenylazo)-8-naphthol-3:6-disulphonic acid. | do | Reddish-grey. |
| 131 | 1:2-chromium complex of 2-(3'-sulphophenylamino)-7-(2''-carboxy-4''-aminophenylazo)-8-naphthol-6-sulphonic acid. | do | Brown. |
| 132 | 1:2-chromium complex of 2-(4'-sulphophenylamino)-7-(2''-carboxy-4''-aminophenylazo)-8-naphthol-6-sulphonic acid. | do | Do. |
| 133 | 1-amino-7-(4'-hydroxy-3'-carboxyphenylazo)-8-naphthol-3:6-disulphonic acid | do | Reddish-violet. |
| 134 | Copper complex of 4:4'-bis(1''-hydroxy-8''-amino-3'':6''-disulphonaphth-2''-ylazo)-3:3'-di(carboxymethoxy)diphenyl. | do | Blue. |
| 135 | 1:2-chromium complex of 1-(3'-aminophenyl)-3-methyl-4-(4''-sulpho-2''-carboxyphenylazo)-5-pyrazolone. | do | Yellow. |
| 136 | 1:2-chromium complex of 1-amino-7-(3'-nitro-6'-hydroxyphenylazo)-8-naphthol-3:6-disulphonic acid. | do | Black. |
| 137 | 1:2-cobalt complex of 1-amino-7-(3'-nitro-6'-hydroxyphenylazo)-8-naphthol-2:6-disulphonic acid. | do | Reddish-grey. |
| 138 | Copper complex of 4:4'bis(1''-hydroxy-6''-amino-3'':5''disulphonaphth-2''-ylazo)-3:3'-dimethoxydiphenyl. | do | Blue. |
| 139 | Copper complex of 4:4'-bis[1''-hydroxy-6''-(4'''-amino-3'''-sulphophenylamino)-3'':5''-disulphonaphth-2''-ylazo]-3:3'-dimethoxydiphenyl. | do | Do. |
| 139A | Copper complex of 2:1'-dihydroxy-6:8'-diamino-1:2'-azonaphthalene-5':7'-disulphonic acid. | 5-cyano-2:4:6-trichloropyrimidine (1 mole) | Do. |

Example 140

In place of the 19.7 parts of copper phthalocyanine-3-sulphon-N-(4'-aminophenyl)amide - 3 - sulphonamide-3-sulphonic acid used in Examples 2 or 4 there are used 19.7 parts of copper phthalocyanine-3-sulphon-N-(3'-aminophenyl)amide-3-sulphonamide - 3 - sulphonic acid or 20 parts of copper phthalocyanine-3-sulphon-N-(3'-amino-4'-methylphenyl)amide - 3 - sulphonamide-3-sulphonic acid or 20.3 parts of copper phthalocyanine-3-sulphon-N-(3'-amino-4'-methoxyphenyl)amide - 3 - sulphonamide-3-sulphonic acid when similar dyestuffs are obtained.

The above copper phthalocyanines may themselves by obtained by the method described in Example 2 for the preparation of copper phthalocyanine - 3 - sulphon-N-(4'-aminophenyl)amide - 3 - sulphonamide-3-sulphonic acid except that the 30 parts of p-aminoacetanilide are replaced by 30 parts of m-aminoacetanilide or by 32.8 parts of 3-amino-6-methylacetanilide or by 36.0 parts of 3-amino-6-methoxyacetanilide respectively.

Example 141

In place of the 19.7 parts of copper phthalocyanine-3-sulphon-N-(4'-aminophenyl)amide - 3 - sulphonamide-3-sulphonic acid used in Examples 2 or 4 there are used 19.7 parts of copper phthalocyanine - 4 - sulphon-N-3'-aminophenyl)amide-4-sulphonamide-4-sulphonic acid or 19.7 parts of copper phthalocyanine-4-sulphon-N-(4'-aminophenyl)amide - 4 - sulphonamide-4-sulphonic acid when similar dyestuffs are obtained.

The copper phthalocyanines used in the above example may be obtained as follows:

196.8 parts of the tetrasodium salt of copper phthalocyanine tetra-4-sulphonic acid are slowly added with stirring to 970 parts of chlorosulphonic acid and the mixture is then stirred for 3 hours at a temperature between 115° and 120° C. The mixture is cooled to a temperature of 80° C., 100 parts of thionyl chloride are added and the mixture is stirred for 2 hours at a temperature between 115° and 120° C. The mixture is then cooled to 20° C., poured on to ice and the precipitated phthalocyanine sulphonchloride is filtered off and washed with 1000 parts of a 10% aqueous solution of hydrochloric acid which has been cooled to 0° C.

The sulphonchloride so obtained is stirred with 1000 parts of water and 600 parts of ice and 30 parts of m-aminoacetanilide or 30 parts of p-aminoacetanilide respectively are then added. The pH of the resulting mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of ammonium hydroxide. The mixture is then stirred at 50° C. until no further additions of the ammonium hydroxide solution are required to maintain the pH at 8. 500 parts of a concentrated aqueous solution of hydrochloric acid are then added and the mixture is stirred for 4 hours at a temperature of 90° C. The mixture is cooled to 20° C. and the precipitated copper phthalocyanine 4-sulphon-N-(3'- or 4'-aminophenyl)amide - 4 - sulphonamide-4-sulphonic acid is then filtered off and dried.

Example 142

A solution of 17.4 parts of 5-cyano-2:4-dichloropyrimidine in 315 parts of acetone is added with stirring to a mixture of 125 parts of water and 125 parts of ice. To the suspension so obtained a solution of 22.7 parts of 2-hydroxy-5-methyl-4'-aminoazobenzene in 630 parts of acetone is added dropwise over 30 minutes keeping the temperature below 5° C. The slight acidity to Congo red paper which develops is removed by adding 0.2 N sodium carbonate solution. The temperature is allowed to rise to 20° C. and the acidity which develops is removed from time to time by further additions of sodium carbonate solution. When no more acidity develops the temperature of the reaction mixture is raised to 30° C. and the mixture stirred at this temperature for 16 hours. The product is then filtered off, washed with water and dried.

The compound so obtained, when dispersed in aqueous medium, dyes polyamide textile materials in yellow shades of good fastness to washing.

Example 143

A mixture of 39.72 parts of 2-chloro-4-methanesulphonyl - 4' - (N-β-hydroxyethyl-N-β'-aminoethyl)aminoazobenzene, 20.9 parts of 5-cyano-2:4:6-trichloropyrimidine, 8.4 parts of sodium bicarbonate and 750 parts of acetone is stirred at 30° C. for 2.75 hours and then at 20° C. for 18 hours. The product is then precipitated by the gradual addition of 600 parts of cold water and after stirring for 2 hours is filtered off, washed with water, and dried.

The compound so obtained, when dispersed in aqueous medium, dyes polyamide textile materials in reddish-orange shades of good fastness to washing.

Example 144

A solution of 2.9 parts of 5-cyano-2:4:6-trichloropyrimidine in 20 parts of acetone is added to a solution of 1.36 parts of potassium thiocyanate in 15 parts of acetone and the resulting mixture is stirred for 30 minutes at 25° C. The mixture is then filtered and the filtrate so obtained is added, with stirring, to a solution of 6.2 parts of the disodium salt of 2-amino-6-(2'-sulphophenylazo)-5-naphthol-7-sulphonic acid in 100 parts of water, and the resulting mixture is then stirred for 1½ hours at 30° C., the pH of the mixture being maintained at 7 by the addition of a 10% aqueous solution of sodium carbonate. 15 parts of sodium chloride are then added and the precipitated dyestuff is filtered off, washed with water and dried.

When applied to cellulose textile materials in conjunction with a treatment with an acid-binding agent the dyestuff yields bright orange shades possessing excellent fastness to washing and to light.

Example 145

100 parts of a plain weave scoured cotton cloth are padded through an aqueous solution containing 1% of the dyestuff of Example 87, 10% of a solution of tetramethylol acetylene diurea, 0.5% of methylol stearamide, 0.2% of a non-ionic wetting agent, 0.5% of ammonium thiocyanate and 0.5% N-methyl glucamine hydrochloride, and the cloth is then squeezed between rollers to a weight of 200 parts. The cloth is dried at 70° C. and then baked at 160° C. for 3 minutes. It is then rinsed for 5 minutes at 80° C. in a solution containing 0.3% sodium carbonate and 0.1% of an anionic detergent. The cloth is finally rinsed in cold water and dried.

The cloth is coloured a bluish-red shade, which is fast to washing, and the cloth is resistant to creasing.

Example 146

100 parts of bleached cotton material are padded through an aqueous solution containing 3.0% of the dyestuff of Example 1, 10% of dimethylol glyoxal monourein, 0.8% of N:N-di(β-hydroxyethyl)amine hydrochloride, 0.2% of N:N-di(β-hydroxyethyl)amine, 1% of methylol stearamide and 0.2% of an alkylated phenol/ ethylene oxide condensate, and the cotton material is then squeezed between rollers until its weight is 200 parts. The cotton material is dried at a temperature of 70° C. and is then baked for 3 minutes at a temperature of 150° C. The cotton material is then rinsed in water, immersed for 5 minutes in a boiling aqueous solution containing 0.5% of sodium carbonate and 0.1% of a mixture of an alkylated phenol/ethylene oxide condensate and a sulphated fatty alcohol, rinsed again in water and finally dried.

The cotton material is coloured a reddish-yellow shade which possesses excellent fastness to light and to wet treatments and the material is resistant to creasing.

*Example 147*

100 parts of bleached cotton material are padded through an aqueous solution containing 0.5% of the dyestuff of Example 2, 7.5% of N-hydroxyethyldimethyltriazone, 2.5% of trimethylol melamine, 1.5% of N-methylglucamine hydrochloride, 1.0% of methylol stearamide and 0.2% of an alkylated phenol/ethylene oxide condensate, and the cotton material is then squeezed between rollers until its weight is 200 parts. The cotton material is dried at a temperature of 70° C. and is then baked for 3 minutes at a temperature of 150° C. The cotton material is then rinsed in water, immersed for 5 minutes in a boiling aqueous solution containing 0.5% of sodium carbonate and 0.1% of a mixture of an alkylated phenol/ethylene oxide condensate and a sulphated fatty alcohol, rinsed again in water and finally dried.

The cotton material is coloured a bright greenish-blue shade which possesses excellent fastness to light and to wet treatments and the cotton material is resistant to creasing.

*Example 148*

100 parts of bleached cotton fabric are padded through an aqueous solution containing 2% of the dyestuff of Example 87, 1% of sodium bicarbonate and 0.2% of an alkylated phenol/ethylene oxide condensate, at a temperature of 18° C. and the cotton fabric is then squeezed between rollers until its weight is 200 parts. The cotton fabric is dried at 70° C. and is then exposed to steam at a temperature of 102° C. for 1 minute. The coloured cotton fabric is then rinsed in water, immersed for 15 minutes in a 0.2% aqueous solution of soap, rinsed again in water and finally dried.

The cotton fabric is thereby coloured a bright bluish-red shade possessing excellent fastness to washing.

In place of the 2% of the dyestuff of Example 87 used in the above example there is used 2% of the dyestuff of Example 104 or 2% of the dyestuff of Example 35 whereby the cotton fabric is coloured in navy blue and brown shades respectively, which possess excellent fastness to washing.

*Example 149*

100 parts of bleached cotton yarn are immersed in a dyebath comprising 2 parts of the dyestuff of Example 87 and 90 parts of sodium chloride dissolved in 3000 parts of water and dyeing is carried out for 30 minutes at a temperature of 20° C. 15 parts of sodium carbonate are then added and dyeing is continued for 60 minutes at 20° C. The dyed cotton yarn is then removed from the dyebath, rinsed in water, immersed for 5 minutes in a 0.2% aqueous solution of a synthetic detergent at a temperature of 100° C., rinsed again in water and finally dried. The cotton yarn is dyed a brilliant bluish-red shade which is fast to washing.

In place of the 2 parts of the dyestuff of Example 87 used in the above example there are used 2 parts of the dyestuff of Example 26 whereby the cotton yarn is dyed in bright orange shades which possess excellent fastness to washing.

*Example 150*

100 parts of bleached cotton fabric are padded through an aqueous solution containing 0.2% of the dyestuff of Example 1 and 2% of sodium carbonate and the cotton fabric is then passed between rollers until its weight is 200 parts. The cotton fabric is then rolled up and stored for 4 hours at a temperature of 20° C. The cotton fabric is then rinsed in water, immersed for 5 minutes in a 0.2% aqueous solution of a synthetic detergent at a temperature of 100° C., rinsed again in water and dried. The cotton fabric is coloured a bright reddish-yellow shade possessing excellent fastness to washing.

*Example 151*

100 parts of woollen cloth are immersed in a dyebath comprising a solution of 1.5 parts of the dyestuff of Example 55, 3.0 parts of ammonium acetate, 0.5 part of cetyltrimethyl-ammonium bromide and 1.0 part of a condensate of ethylene oxide with a fatty alcohol in 5000 parts of water, and dyeing is carried out for 1 hour at a temperature of 100° C. The dyed woollen cloth is then removed from the dyebath, rinsed in water and dried. The woollen cloth is dyed a bluish-red shade possessing excellent fastness to washing.

*Example 152*

A print paste comprising:

| | Parts |
|---|---|
| The dystuff of Example 26 | 3 |
| Urea | 10 |
| Water | 50.5 |
| Sodium bicarbonate | 1.5 |
| 4% aqueous solution of sodium alginate | 35 |
| | 100 | is applied to unmercerised cotton cloth by machine printing. The printed cotton cloth is dried at a temperature of 70° C. and is then steamed for 6 minutes at a temperature of 100° C. The printed cotton cloth is then rinsed in water, immersed for 10 minutes in a 0.3% aqueous solution of a synthetic detergent at a temperature of 100° C., rinsed again in water and finally dried.

The cotton cloth is thereby printed an orange shade which possesses excellent fastness to wet treatments.

In place of the unmercerised cotton cloth used in the above example there may be used mercerised sateen cloth or viscose rayon cloth when orange prints are also obtained which possess excellent fastness to wet treatments.

In place of the 3 parts of the dyestuff of Example 26 used in the above example there are used 3 parts of the dyestuff of Example 1, or 3 parts of the dyestuff of Example 35 or 3 parts of the dyestuff of Example 87 or 3 parts of the dyestuff of Example 104 or 3 parts of the dyestuff of Example 55 whereby there are obtained reddish-yellow, brown, bluish-red, navy-blue and bluish-red prints respectively which possess excellent fastness to washing.

What we claim is:

1. Process for colouring textile materials which consists essentially in treating the textile materials with a water-soluble dyestuff of the formula:

D—A—X wherein D is a dyestuff chromophoric radical selected from the class consisting of azo, anthraquinone, nitro, and phthalocyanine radicals, A is a member selected from the group consisting of —O—, —S— and —NR—, R represents a member of the group consisting of hydrogen, substituted alkyl and unsubstituted alkyl radicals and X represents a pyrimidine ring which is attached to A through the carbon atom in one of the 2- and 4-positions of the pyrimidine ring, and which carries a substituent selected from the group consisting of cyano, carboxy and carboalkoxy groups attached to the 5-position of the pyrimidine ring, and which carries two halogen atoms, selected from the group consisting of chlorine to bromine atoms, attached to the remaining carbon atoms of the pyrimidine ring, and said group —A—X is attached to a carbon atom in the dyestuff.

2. The process of claim 1 wherein said group of the formula —A—X stands for the group of the formula:

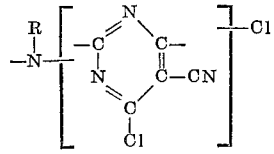

wherein R has the meaning stated in claim 1.

3. Process for colouring cellulose textile materials which comprises treating the celluloe textile material with a dyestuff which contains at least one carboxylic or sulphonic acid group and at least one group of the formula —A—X, as defined in claim 1, in conjunction with a treatment with an acid-binding agent.

4. Process as claimed in claim 3 wherein the cellulose textile material is treated with the acid-binding agent before the treatment with the dyestuff.

5. Process as claimed in claim 3 wherein the cellulose textile material is simultaneously treated with the dyestuff and with the acid-binding agent.

6. Process as claimed in claim 3 wherein the cellulose textile material is treated with the acid-binding agent after the cellulose textile material has absorbed some or all of the dyestuff.

7. Process as claimed in claim 3 wherein the cellulose textile material is subsequently subjected to the action of heat or steam.

8. Process for colouring textile materials which comprises treating the textile material with an aqueous solution containing (a) a water-soluble dyestuff of the formula:

$$D—A—X$$

wherein D is a dyestuff chromophoric radical selected from the class consisting of azo, anthraquinone, nitro, and phthalocyanine chromophoric radicals, A is a member selected from the group consisting of —O—, —S— and

R represents a member of the group consisting of hydrogen, substituted alkyl and unsubstituted alkyl radicals and X represents a pyrimidine ring which is attached to A through the carbon atom in one of the 2- and 4-positions of the pyrimidine ring, and which carries a substituent selected from the group consisting of cyano, carboxy and carboalkoxy groups attached to the 5-position of the pyrimidine ring, and which carries two halogen atoms, selected from the group consisting of chlorine to bromine atoms, attached to the remaining carbon atoms of the pyrimidine ring, and said group —A—X is attached to a carbon atom in the dyestuff; (b) a resin-forming composition; and (c) an acid catalyst, and thereafter baking the textile material at a temperature above 100° C.

9. Process as claimed in claim 8 wherein the textile material is a cellulose textile material.

References Cited in the file of this patent

UNITED STATES PATENTS

| 2,935,506 | Heslop et al. | May 3, 1960 |
| 2,940,817 | Browne | June 14, 1960 |
| 2,995,412 | Kleb | Aug. 8, 1961 |

FOREIGN PATENTS

| 822,948 | Great Britain | Nov. 4, 1959 |